(12) United States Patent
Wang et al.

(10) Patent No.: US 11,988,937 B2
(45) Date of Patent: *May 21, 2024

(54) APPARATUS INCLUDING AN ELECTROCHROMIC DEVICE CONFIGURED TO MAINTAIN A CONTINUOUSLY GRADED TRANSMISSION STATE

(71) Applicant: SAGE ELECTROCHROMICS, INC., Faribault, MN (US)

(72) Inventors: Yigang Wang, Plymouth, MN (US); Bryan D. Greer, Northfield, MN (US)

(73) Assignee: SAGE ELECTROCHROMICS, INC., Faribault, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/047,718

(22) Filed: Oct. 19, 2022

(65) Prior Publication Data

US 2023/0082345 A1    Mar. 16, 2023

Related U.S. Application Data

(63) Continuation of application No. 15/848,727, filed on Dec. 20, 2017, now Pat. No. 11,500,258.

(Continued)

(51) Int. Cl.
*G02F 1/155* (2006.01)
*G02F 1/163* (2006.01)

(52) U.S. Cl.
CPC .............. *G02F 1/155* (2013.01); *G02F 1/163* (2013.01); *G02F 2203/01* (2013.01)

(58) Field of Classification Search
CPC ....... G02F 1/155; G02F 1/163; G02F 2203/01

(Continued)

(56) References Cited

U.S. PATENT DOCUMENTS

| 4,832,468 A | 5/1989 | Ito et al. |
| 4,923,289 A | 5/1990 | Demiryont |

(Continued)

FOREIGN PATENT DOCUMENTS

| CN | 1537257 A | 10/2004 |
| CN | 1938642 A | 3/2007 |

(Continued)

OTHER PUBLICATIONS

International Search Report & Written Opinion for PCT/US2013/051479, dated Jan. 28, 2014, 7 pages.

(Continued)

*Primary Examiner* — Wyatt A Stoffa
*Assistant Examiner* — Mitchell T Oestreich
(74) *Attorney, Agent, or Firm* — Abel Schillinger, LLP; Robert N Young

(57) ABSTRACT

An apparatus can include an electrochromic device configured to be maintained a continuously graded transmission state. When using the apparatus, the electrochromic device can be switched from a first transmission state to a continuously graded transmission state and maintained in the continuously graded transmission state. The current during switching can be higher than current during maintaining the continuously graded transmission state. In an embodiment, the grading can be reversed to provide a mirror image of the grading. In another embodiment, at least 27% and up to 100% of the electrochromic device can be in a continuously graded transmission state. The control device can be located within an insulating glass unit, adjacent to the insulating glass unit, or remotely from the insulating glass unit. In a further embodiment, a gap between bus bars can be used to form a portion of the electrochromic device that can be continuously graded.

18 Claims, 9 Drawing Sheets

Related U.S. Application Data

(60) Provisional application No. 62/438,296, filed on Dec. 22, 2016.

(58) Field of Classification Search
USPC .......................................................... 359/275
See application file for complete search history.

(56) References Cited

U.S. PATENT DOCUMENTS

| | | |
|---|---|---|
| 5,066,111 A | 11/1991 | Singleton et al. |
| 5,138,481 A | 8/1992 | Demiryont |
| 5,182,431 A | 1/1993 | Koontz et al. |
| 5,444,330 A | 8/1995 | Leventis et al. |
| 5,805,367 A | 9/1998 | Kanazawa |
| 6,195,196 B1 | 2/2001 | Kimura et al. |
| 6,317,248 B1 | 11/2001 | Agrawal et al. |
| 6,492,619 B1 | 12/2002 | Sol |
| 6,707,590 B1 | 3/2004 | Bartsch |
| 6,995,892 B2 | 2/2006 | Fanton et al. |
| 7,372,610 B2 | 5/2008 | Burdis et al. |
| 7,593,154 B2 | 9/2009 | Burdis et al. |
| 7,710,671 B1 | 5/2010 | Kwak et al. |
| 7,830,585 B2 | 11/2010 | Widjaja et al. |
| 7,952,785 B2 | 5/2011 | Karmhag et al. |
| 7,990,603 B2 | 8/2011 | Ash et al. |
| 8,004,744 B2 | 8/2011 | Burdis et al. |
| 8,228,587 B2 | 7/2012 | Burdis |
| 9,341,912 B2 | 5/2016 | Shrivastava et al. |
| 2002/0005977 A1 | 1/2002 | Guarr et al. |
| 2002/0044331 A1 | 4/2002 | Agrawal et al. |
| 2002/0135881 A1 | 9/2002 | Rukavina et al. |
| 2003/0047457 A1 | 3/2003 | Rukavina et al. |
| 2003/0227663 A1 | 12/2003 | Agrawal et al. |
| 2006/0181772 A1 | 8/2006 | Byers et al. |
| 2007/0133078 A1 | 6/2007 | Fanton et al. |
| 2007/0257128 A1 | 11/2007 | Guarr et al. |
| 2008/0169185 A1 | 7/2008 | Burdis et al. |
| 2009/0323160 A1 | 12/2009 | Egerton et al. |
| 2010/0243427 A1 | 9/2010 | Kozlowski et al. |
| 2011/0061708 A1 | 3/2011 | Huang |
| 2011/0260961 A1 | 10/2011 | Burdis |
| 2011/0267672 A1 | 11/2011 | Sbar et al. |
| 2012/0019889 A1 | 1/2012 | Lamine et al. |
| 2012/0026573 A1 | 2/2012 | Collins et al. |
| 2012/0062976 A1 | 3/2012 | Burdis |
| 2012/0069420 A1 | 3/2012 | Suzuki |
| 2012/0081775 A1 | 4/2012 | Ersman et al. |
| 2012/0194895 A1 | 8/2012 | Podbelski et al. |
| 2012/0200908 A1 | 8/2012 | Bergh et al. |
| 2012/0293855 A1 | 11/2012 | Shrivastava et al. |
| 2012/0300280 A1 | 11/2012 | Murphy et al. |
| 2012/0327499 A1 | 12/2012 | Parker et al. |
| 2013/0021659 A1 | 1/2013 | Friedman et al. |
| 2013/0222877 A1 | 8/2013 | Greer et al. |
| 2013/0222878 A1 | 8/2013 | Greer et al. |
| 2014/0177028 A1 | 6/2014 | Shrivastava et al. |
| 2015/0077829 A1 | 3/2015 | Greer et al. |
| 2015/0092259 A1 | 4/2015 | Greer et al. |
| 2016/0202591 A1 | 7/2016 | Greer |
| 2018/0284555 A1 | 10/2018 | Klawuhn et al. |
| 2019/0011793 A1 | 1/2019 | Jack et al. |
| 2019/0204704 A1 | 7/2019 | Greer |

FOREIGN PATENT DOCUMENTS

| | | |
|---|---|---|
| CN | 1308761 C | 4/2007 |
| CN | 102203370 A | 9/2011 |
| CN | 102460292 A | 5/2012 |
| CN | 104246594 A | 12/2014 |
| CN | 104781493 A | 7/2015 |
| CN | 104898345 A | 9/2015 |
| EP | 0363045 A1 | 9/1989 |
| EP | 1297380 B1 | 11/2008 |
| EP | 2561402 A1 | 2/2013 |
| FR | 2957159 A1 | 9/2011 |
| JP | S61171034 U | 8/1986 |
| JP | S61229610 A | 10/1986 |
| JP | S6219631 U | 2/1987 |
| JP | H01277825 A | 11/1989 |
| JP | H02134519 U | 11/1990 |
| JP | H06167724 A | 6/1994 |
| JP | H07070218 A | 3/1995 |
| JP | H08253076 A | 10/1996 |
| JP | 2004537755 A | 12/2004 |
| JP | 2011526378 A | 10/2011 |
| JP | 2012042814 A | 3/2012 |
| JP | 2012063657 A | 3/2012 |
| JP | 2012155017 A | 8/2012 |
| JP | 2012524290 A | 10/2012 |
| JP | 2014029556 A | 2/2014 |
| JP | 2014529108 A | 10/2014 |
| JP | 2015014784 A | 1/2015 |
| JP | 2015527614 A | 9/2015 |
| WO | 2003012541 A2 | 2/2003 |
| WO | 2006085258 A2 | 8/2006 |
| WO | 2007100921 A2 | 9/2007 |
| WO | 2009000547 A2 | 12/2008 |
| WO | 2009158510 A2 | 12/2009 |
| WO | 2011101427 A1 | 8/2011 |
| WO | 2011133294 A1 | 10/2011 |
| WO | 2013130781 A1 | 9/2013 |
| WO | 2014078429 A1 | 5/2014 |
| WO | 2014137378 A1 | 9/2014 |
| WO | 2018119095 A1 | 6/2018 |

OTHER PUBLICATIONS

International Search Report and Written Opinion for PCT/US2013/028283, dated May 13, 2013, 10 pages.

Pahlavan, M., "Adaptable façade with electrochromic material," Architecture and Building Technology Graduate Report, Jan. 2011, 114 pages.

Kondo, Y. et al., "Electrochromic Type E-Paper Using Poly(1H-Thieno[3,4-d] Imidazol-2(3H)-One) Derivatives by a Novel Printing Fabrication Process," Materials, published Dec. 14, 2011, pp. 2171-2182, vol. 4, CH.

International Search Report and Written Opinion for PCT/US2017/067636, dated Apr. 16, 2018, 12 pages.

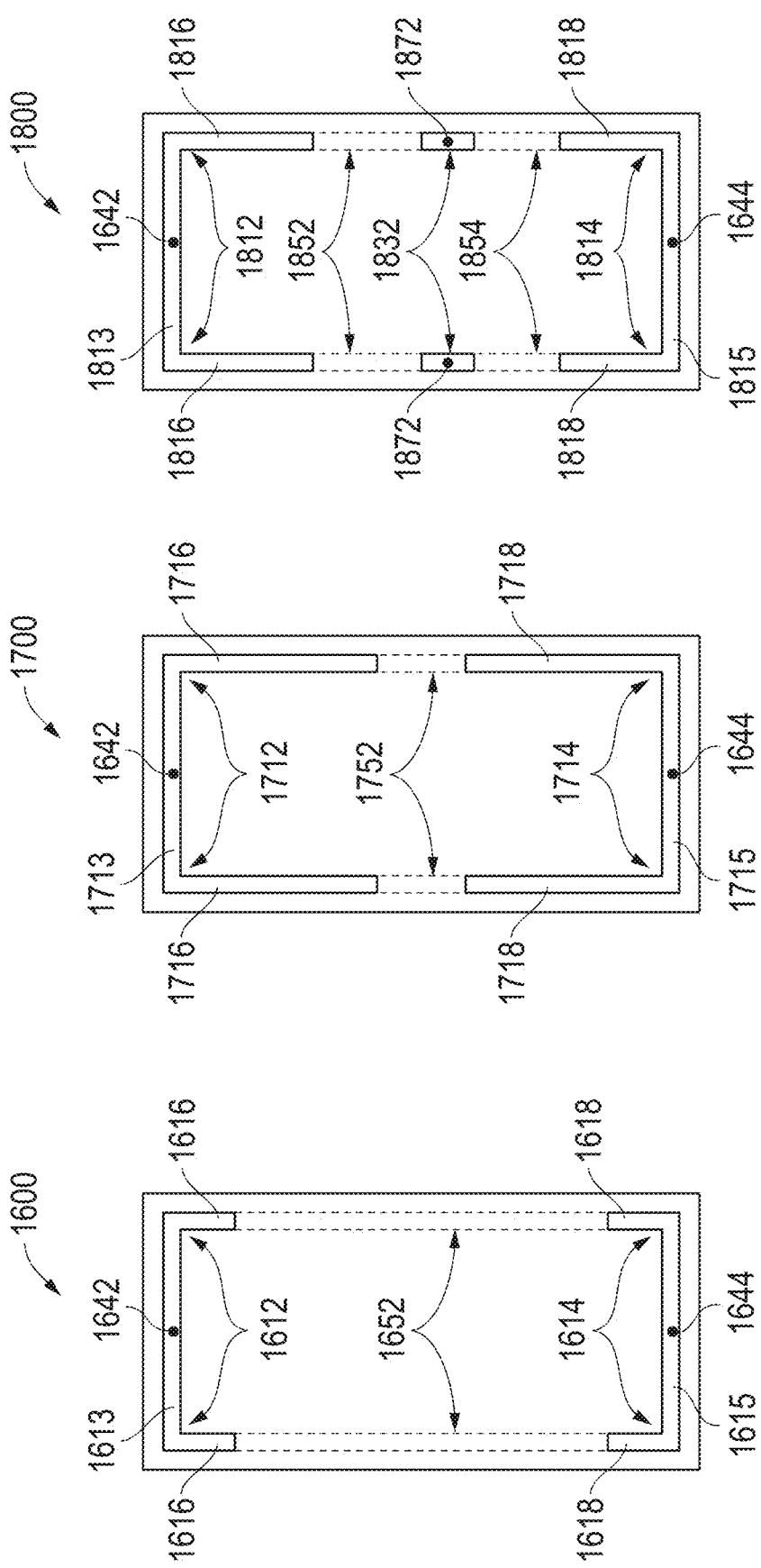

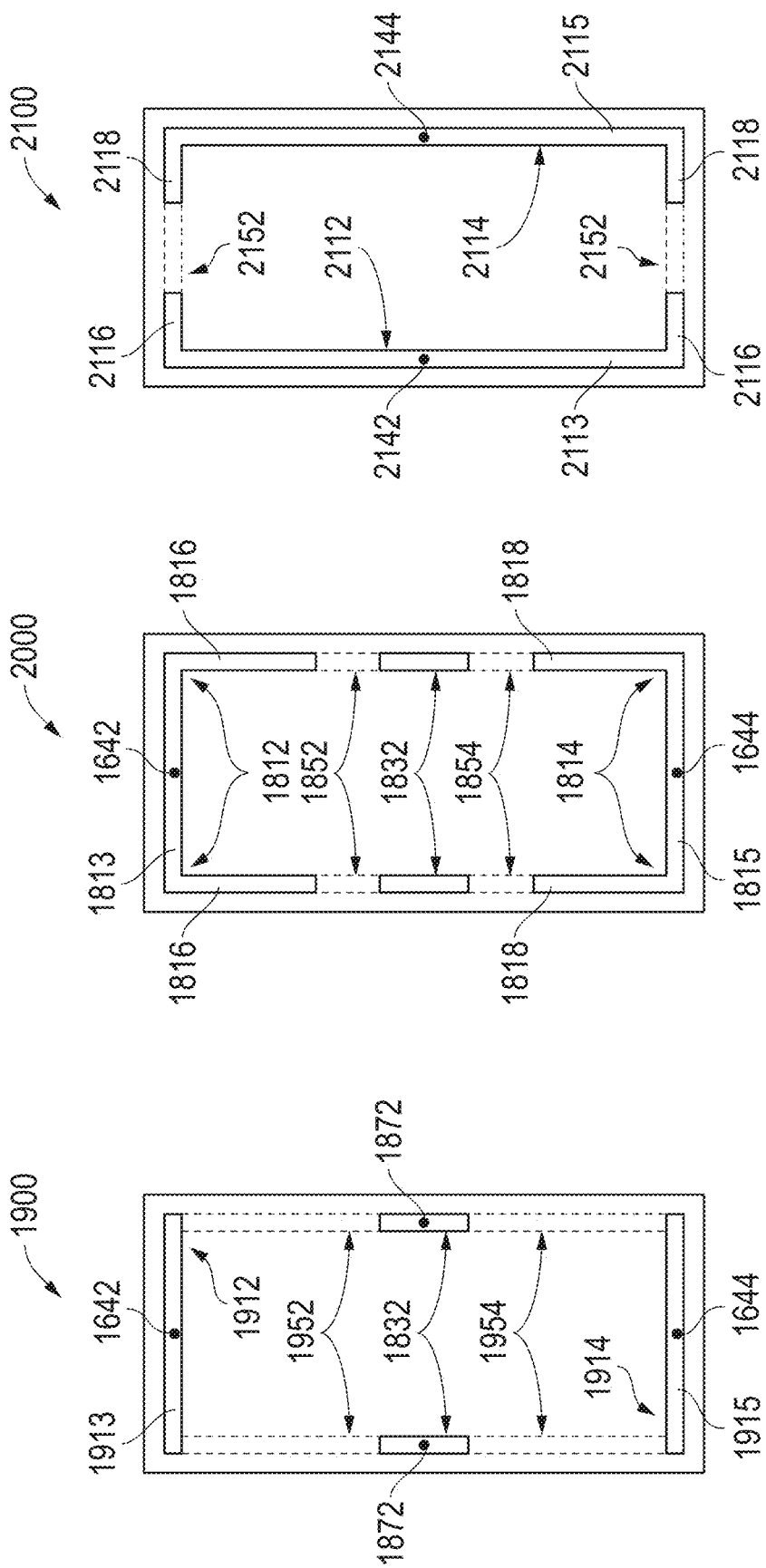

APPARATUS INCLUDING AN ELECTROCHROMIC DEVICE CONFIGURED TO MAINTAIN A CONTINUOUSLY GRADED TRANSMISSION STATE

CROSS-REFERENCE TO RELATED APPLICATION

This application is a continuation application of and claims priority under 35 U.S.C. § 120 to U.S. patent application Ser. No. 15/848,727, entitled "APPARATUS INCLUDING AN ELECTROCHROMIC DEVICE CONFIGURED TO MAINTAIN A CONTINUOUSLY GRADED TRANSMISSION STATE," by Yigang WANG, filed Dec. 20, 2017, which claims priority under 35 U.S.C. § 119(e) to U.S. Provisional Patent Application No. 62/438,296, filed Dec. 22, 2016, entitled "APPARATUS INCLUDING AN ELECTROCHROMIC DEVICE CONFIGURED TO MAINTAIN A CONTINUOUSLY GRADED TRANSMISSION STATE," naming as an inventor Bryan D. Greer, of which both applications are assigned to the current assignee hereof and incorporated by reference herein in their entireties.

BACKGROUND

Field of the Disclosure

The present disclosure is directed to apparatuses, and more specifically to apparatuses including electrochromic devices and method of using the same.

Related Art

An electrochromic device can reduce the amount of sunlight entering a room or passenger compartment of a vehicle. Conventionally, all of an electrochromic device can be at a particular transmission state. For example, all of the electrochromic device may be at 0% tinting, all may be at 100% tinting, or all may be at a value between the two. A glass pane may be formed with different discrete electrochromic devices, each controlled by its own pair of bus bars. The different electrochromic devices can each be controlled to a different transmission state. For example, an electrochromic device near the top of the pane may be at 100% tinting, another electrochromic device near the bottom of the pane may be at 0% tinting, and a further electrochromic device between the other two electrochromic devices may be at 50% tinting. Further improvement in control regarding tinting of an electrochromic device is desired.

BRIEF DESCRIPTION OF THE DRAWINGS

Embodiments are illustrated by way of example and are not limited in the accompanying figures.

FIG. 16 includes an illustration of a top view of a structure including bus bars having extensions and gaps between the extensions in accordance with an embodiment.

FIG. 17 includes an illustration of a top view of a structure having bus bars having extensions and gaps between the extensions in accordance with another embodiment.

FIG. 18 includes an illustration of a top view of a structure including bus bars having extensions, spaced-apart bus bars between the extension, and gaps between the extensions the spaced-apart bus bars in accordance with a further embodiment.

FIG. 19 includes an illustration of a top view of a structure including bus bars without extensions, spaced-apart bus bars, and gaps between the bus bars in accordance with another embodiment.

FIG. 20 includes an illustration of a top view of the structure of FIG. 18 without electrical connections to the spaced-apart bus bars in accordance with a further embodiment.

FIG. 21 includes an illustration of a top view of a structure including bus bars having extensions and gaps between the extensions, wherein the orientation of the lengths of the gaps are in a horizontal direction in accordance with an embodiment.

Figure 1:
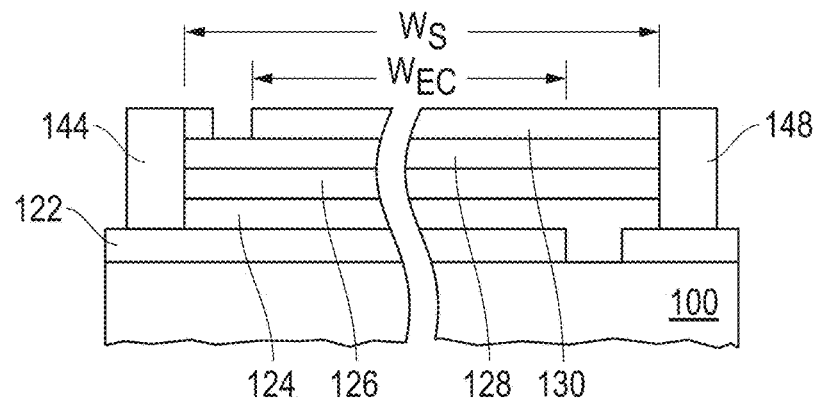
FIG. 1 includes an illustration of a cross-sectional view of a portion of a substrate, a stack of layers for an electrochromic device, and bus bars.

Skilled artisans appreciate that elements in the figures are illustrated for simplicity and clarity and have not necessarily been drawn to scale. For example, the dimensions of some of the elements in the figures may be exaggerated relative to other elements to help to improve understanding of embodiments of the invention.

DETAILED DESCRIPTION

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings.

As used herein, the terms "comprises," "comprising," "includes," "including," "has," "having," or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

The use of "a" or "an" is employed to describe elements and components described herein. This is done merely for convenience and to give a general sense of the scope of the invention. This description should be read to include one or at least one and the singular also includes the plural, or vice versa, unless it is clear that it is meant otherwise.

When referring to variables, the term "steady state" is intended to mean that an operating variable is substantially constant when averaged over 10 seconds, even through the operating variable may be change during a transient state. For example, when in steady state, an operating variable may be maintained within 10%, within 5%, or within 0.9% of an average for the operating variable for a particular mode of operation for a particular device. Variations may be due to imperfections in an apparatus or supporting equipment, such as noise transmitted along voltage lines, switching transistors within a control device, operating other components within an apparatus, or other similar effects. Still further, a variable may be changed for a microsecond each second, so that a variable, such as voltage or current, may be read; or one or more of the voltage supply terminals may alternate between two different voltages (e.g., 1 V and 2 V) at a frequency of 1 Hz or greater. Thus, an apparatus may be at steady state even with such variations due to imperfections or when reading operating parameters. When changing between modes of operation, one or more of the operating variables may be in a transient state. Examples of such variables can include voltages at particular locations within an electrochromic device or current flowing through the electrochromic device.

The use of the word "about", "approximately", or "substantially" is intended to mean that a value of a parameter is close to a stated value or position. However, minor differences may prevent the values or positions from being exactly as stated. Thus, differences of up to ten percent (10%) for the value are reasonable differences from the ideal goal of exactly as described. A significant difference can be when the difference is greater than ten percent (10%).

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in textbooks and other sources within the glass, vapor deposition, and electrochromic arts.

An electrochromic device can be maintained in a continuously graded transmission state for nearly any time period, for example, such as beyond the time needed for switching between states. When continuously graded, the electrochromic device can have a relatively higher electrical field between bus bars at an area with relatively less transmission and a relatively lower electrical field between the bus bars at another area with relative greater transmission. The continuous grading allows for a more visibly pleasing transition between less transmission to greater transmission, as compare to discrete grading. A set of voltage supply terminals along bus bars can be adjusted to voltages that can range from fully bleached (highest transmission) to fully tinted (lowest transmission state), or anything in between. Still further, the electrochromic device can be operated with a substantially uniform transmission state across all of the area of the electrochromic device, with a continuously graded transmission state across all of the area of the electrochromic device, or with a combination of a portion with a substantially uniform transmission state and another portion with a continuously graded transmission state.

Many different patterns for the continuously graded transmission state can be achieved by the proper selection of voltages on power supply terminals coupled to the bus bars, the number of voltage supply terminals coupled to each bus bar, locations of voltage supply terminals along the bus bars, or any combination thereof. In another embodiment, gaps between bus bars can be used to achieve a continuously graded transmission state.

The electrochromic device can be used as part of a window for a building or a vehicle. The electrochromic device can be used within an apparatus. The apparatus can further include an energy source, an input/output unit, and a control device that controls the electrochromic device. Components within the apparatus may be located near or remotely from the electrochromic device. In an embodiment, one or more of such components may be integrated with environmental controls within a building.

The embodiments as illustrated in the figures and described below help in understanding particular applications for implementing the concepts as described herein. In the description below, an electrochromic device will be described as operating with voltages on bus bars being in a range of 0 V to 3 V. Such description is used to simplify concepts as described herein. Other voltage may be used with the electrochromic device or if the composition or thicknesses of layers within an electrochromic stack are changed. The voltages on bus bars may both be positive (1 V to 4 V), both negative (−5 V to −2 V), or a combination of negative and positive voltages (−1 V to 2 V), as the voltage difference between bus bars are more important than the actual voltages. Furthermore, the voltage difference between the bus bars may be less than or greater than 3 V. After reading this specification, skilled artisans will be able to determine voltage differences for different operating modes to meet the needs or desires for a particular application. The embodiments are exemplary and not intended to limit the scope of the appended claims.

FIG. 1 includes a cross-sectional view of a portion of substrate 100, a stack of layers 122, 124, 126, 128, and 130, and bus bars 144 and 148 overlying the substrate 100. The substrate 100 can include a glass substrate, a sapphire substrate, an aluminum oxynitride substrate, a spinel substrate, or a transparent polymer. In a particular embodiment, the substrate 100 can be float glass or a borosilicate glass and have a thickness in a range of 0.5 mm to 4 mm thick. In another particular embodiment, the substrate 100 can include ultra-thin glass that is a mineral glass having a thickness in a range of 50 microns to 300 microns.

The stack of layers includes transparent conductive layers 122 and 130 that are coupled to the bus bars 144 and 148, respectively. The transparent conductive layers 122 and 130 can include a conductive metal oxide or a conductive polymer. Examples can include a tin oxide or a zinc oxide, either of which can doped with a trivalent element, such as Al, Ga, In, or the like, or a sulfonated polymer, such as polyaniline, polypyrrole, poly(3,4-ethylenedioxythiophene), or the like. The transparent conductive layers 122 and 130 can have the same or different compositions. The layers 124 and 128 are electrode layers, wherein one of the layers is an electrochromic layer and the other of the layers is an ion storage layer (sometimes called a counter electrode layer). The electrochromic layer can include an inorganic metal oxide electrochemically active material, such as $WO_3$, $V_2O_5$, $MoO_3$, $Nb_2O_5$, $TiO_2$, CuO, $Ir_2O_3$, $Cr_2O_3$, $Co_2O_3$, $Mn_2O_3$, or any combination thereof and have a thickness in a range of 50 nm to 2000 nm. The ion storage layer can include any of the materials listed with respect to the electrochromic layer and may further include nickel oxide (NiO, $Ni_2O_3$, or combination of the two), and Li, Na, H, or another ion and have a thickness in a range of 80 nm to 500 nm. An ion conductive layer 126 (sometimes called an electrolyte layer) is optional, is between the electrode layers 124 and 128, and has a thickness in a range of 20 microns to 60 microns. The ion conductive layer 126 allows ions to migrate therethrough and does not allow a significant amount of electrons to pass therethrough. The ion conductive layer 126 can include a silicate with or without lithium, aluminum, zirconium, phosphorus, boron; a borate with or without lithium; a tantalum oxide with or without lithium; a lanthanide-based material with or without lithium; another lithium-based ceramic material; or the like. After reading this specification, skilled artisans will appreciate that other compositions and thicknesses for the layers 122, 124, 126, 128, and 130 can be used without departing from the scope of the concepts described herein.

Each of the transparent conductive layers 122 and 130 include portions removed, so that the bus bars 144 and 148 are not electrically connected to each other. Such removed portions are typically 20 nm to 2000 nm wide. In a particular embodiment, the bus bar 144 is electrically connected to the electrode layer 124 via the transparent conductive layer 122, and the bus bar 148 is electrically connected to the electrode layer 128 via the transparent conductive layer 130. The bus bars 144 and 148 include a conductive material. In an embodiment, each of the bus bars 144 and 148 can be formed using a conductive ink, such as a silver frit, that is printed over the transparent conductive layer 122. In another embodiment, one or both of the bus bars 144 and 148 can include a metal-filled polymer, such as a silver-filled epoxy. In a particular embodiment (not illustrated), the bus bar 148 can include the conductive-filled polymer that is over the transparent conductive layer 130 and spaced apart from the layers 122, 124, 126, and 128. The viscosity of the precursor for the metal-filled polymer may be sufficiently high enough to keep the precursor from flowing through cracks or other microscopic defects in the underlying layers that might be otherwise problematic for the conductive ink.

In the embodiment illustrated, the width of the electrochromic device $W_{EC}$ is a dimension that corresponds to the lateral distance between the removed portions of the transparent conductive layers 122 and 130. $W_S$ is the width of the stack between the bus bars 144 and 148. The difference in $W_S$ and $W_{EC}$ is at most 5 cm, at most 2 cm, or at most 0.9 cm. Thus, most of the width of the stack corresponds to the operational part of the electrochromic device that allows for different transmission states. In an embodiment, such operational part is the main body of the electrochromic device and can occupy at least 90%, at least 95%, at least 98% or more of the area between the bus bars 144 and 148.

Figure 2:
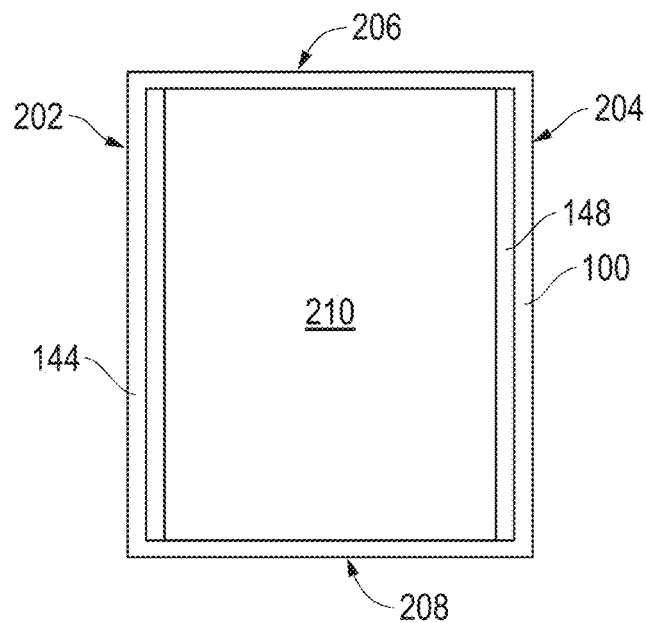
FIG. 2 includes an illustration of a top view of the substrate, the stack of layers, and the bus bars.

FIG. 2 includes a top view of the substrate 100 and an electrochromic device 210 that includes the layers as described with respect to FIG. 1. The bus bar 144 lies along a side 202 of the substrate 100, and the bus bar 148 lies along a side 204 that is opposite the side 202. Each of the bus bars 144 and 148 have lengths that extend a majority of the distance between a side 206 and a side 208 that is opposite the side 206. In a particular embodiment, each of the bus bars 144 and 148 have a length that is at least 75%, at least 90%, or at least 95% of the distance between the sides 206 and 208. The lengths of the bus bars 144 and 148 are substantially parallel to each other. As used herein, substantially parallel is intended to means that the lengths of the bus bars 144 and 148 are within 10 degrees of being parallel to each other. Along the length, each of the bus bars has a substantially uniform cross-sectional area and composition. Thus, in such an embodiment, the bus bars 144 and 148 have a substantially constant resistance per unit length along their respective lengths.

Figure 3:
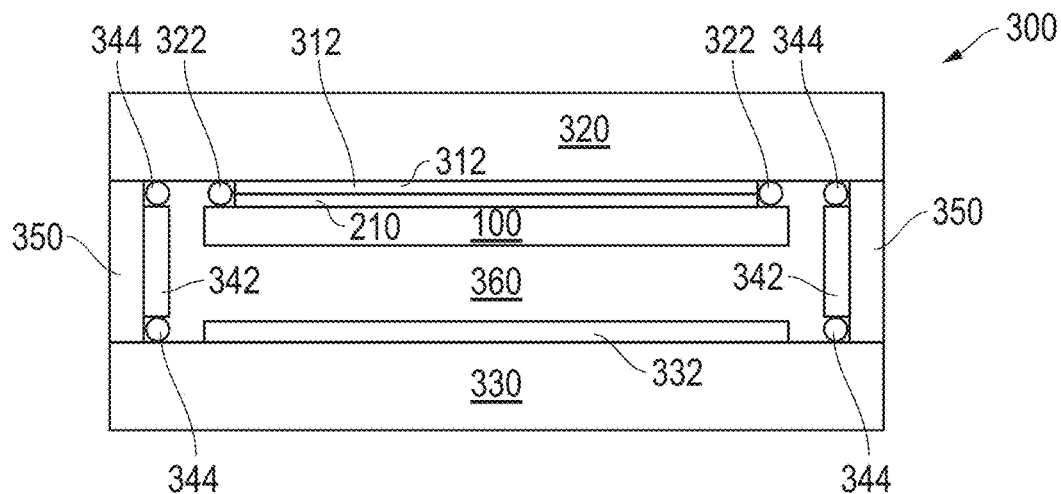
FIG. 3 includes an illustration of a cross-sectional view of an insulating glass unit that includes the substrate and an electrochromic device.

FIG. 3 includes an illustration of a cross-sectional of an insulated glass unit (IGU) 300 that includes the substrate 100 and the electrochromic device 210 as illustrated in FIG. 1. The IGU 300 further includes a counter substrate 320 and a solar control film 312 disposed between the electrochromic device 210 and the counter substrate 320. A seal 322 is disposed between the substrate 100 and the counter substrate 320 and around the electrochromic device 210. The seal 322 can include a polymer, such as polyisobutylene. The counter substrate 320 is coupled to a pane 330. Each of the counter substrate 320 and pane 330 can be a toughened or a tempered glass and have a thickness in a range of 2 mm to 9 mm. A low-emissivity layer 332 can be disposed along an inner surface of the pane 330. The counter substrate 320 and pane 330 can be spaced apart by a spacer bar 342 that surrounds the substrate 100 and electrochromic device 210. The spacer bar 342 is coupled to the counter substrate 320 and pane 330 via seals 344. The seals 344 can be a polymer, such as polyisobutylene. The seals 344 can have the same or different composition as compared to the seal 322. An adhesive joint 350 is designed to hold the counter substrate 320 and the pane 330 together and is provided along the entire circumference of the edges of the counter substrate 320 and the pane 330. An internal space 360 of the IGU 300 may include a relatively inert gas, such as a noble gas or dry air. In another embodiment, the internal space 360 may be evacuated.

Figure 4:
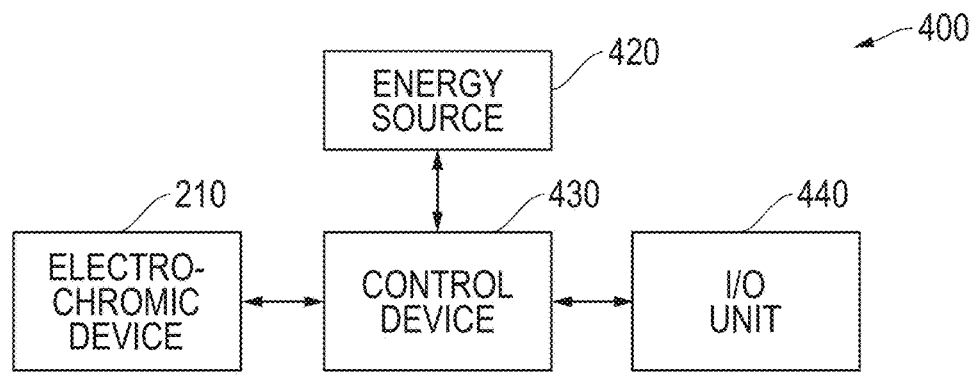
FIG. 4 includes a schematic diagram of an apparatus that includes the electrochromic device, an energy source, a control device, and an input/output unit.

FIG. 4 includes a simplified schematic diagram of an apparatus 400 that includes the electrochromic device 210, an energy source 420, a control device 430, and an input/output (I/O) unit 440. The energy source 420 provides energy to the electrochromic device 210 via the control device 430. In an embodiment, the energy source 420 may include a photovoltaic cell, a battery, another suitable energy source, or any combination thereof. The control device 430 can be coupled to the electrochromic device 210 and the energy source 420. The control device 430 can include logic to control the operation of the electrochromic device 210 and will be described in more detail later in this specification. The logic for the control device 430 can be in the form of hardware, software, or firmware. In an embodiment, the logic may be stored in a field programmable gate array (FPGA), an application-specific integrated circuit (ASIC), or another persistent memory. In an embodiment, the control device 430 may include a processor that can execute instructions stored in memory within the control device 430 or received from an external source. The I/O unit 440 is coupled to the control device. The I/O unit 440 can provide information from sensors, such as light, motion, temperature, another suitable parameter, or any combination thereof. The I/O unit 440 may provide information regarding the electrochromic device 210, the energy source 420, or control device 430 to another portion of the apparatus 400 or to another destination outside the apparatus 400. Such information may include status of any of the components in FIG. 4, voltage, current, energy usage, or the like.

The energy source 420, the control 430, and the I/O unit 440 may be located near or remotely from the electrochromic device 210. In an embodiment, the IGU 300 in FIG. 3 may include the electrochromic device 210 and the energy source 420. In another embodiment, the energy source 420, control device 430, the I/O unit 440 may be located in or attached to a frame that holds the IGU 300. In a further embodiment, the control device 430, the I/O unit 440, or both may be remotely located from the IGU 300 and frame. For example, the control device 430 and the I/O unit 440 may be coupled to or share functions with a building's environmental systems, such as heating, ventilation, and air conditioning; lights for the building; etc. After reading this specification, skilled artisans will be able to determine particular location of components of the apparatus 400 for a particular application.

Figure 5:
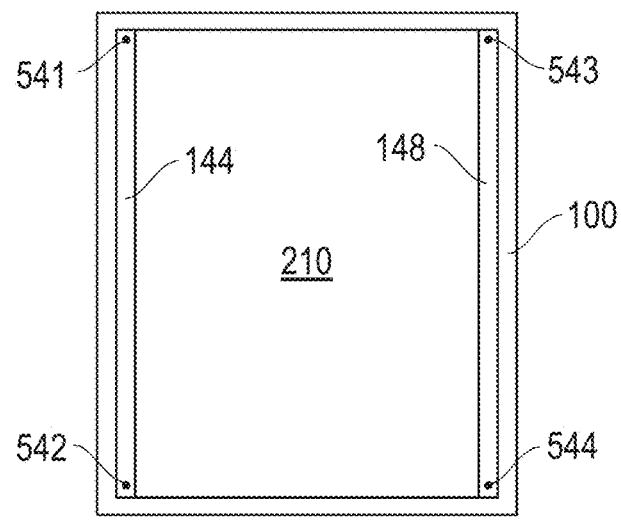
FIG. 5 includes an illustration of a top view of the structure of FIG. 2 including voltage supply terminals in accordance with an embodiment.

Voltage supply terminals can be attached to the bus bars. FIG. 5 includes an illustration of a particular embodiment having two terminals for each bus bar. More particularly, voltage supply terminals 541 and 542 are electrically connected at or near opposite ends of the bus bar 144, and the voltage supply terminals 543 and 544 are electrically connected at or near opposite ends of the bus bar 148. For example, each of the voltage supply terminals may be connected within 5 cm of its closest end of its respective bus bar. The voltage supply terminals 541 to 544 can be controlled separately from one another. The ability to control the voltage supply terminals 541 and 544 allow for more control over continuous grading of light transmission through the electrochromic device 210, as will be described in more detail later in this specification.

Figure 6:
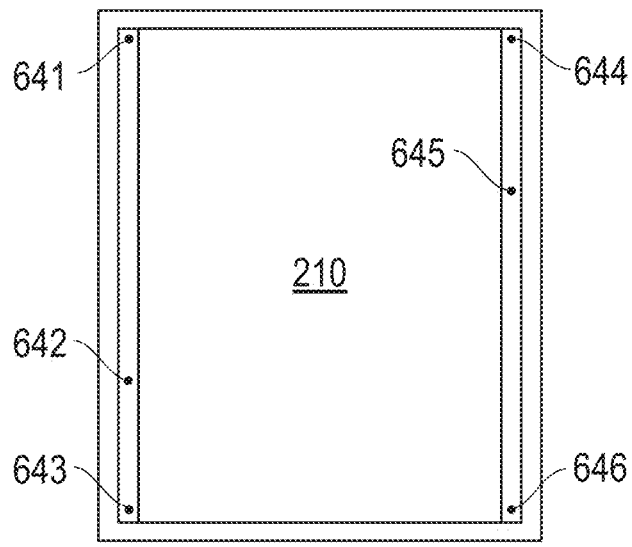
FIG. 6 includes an illustration of a top view of the structure of FIG. 2 including voltage supply terminals in accordance with another embodiment.

The number of voltage supply terminals is not limited to configuration as shown in FIG. 5. Three, four, five or more voltage supply terminals may be connected to either or both of the bus bars 144 and 148. The terminals may be substantially equally spaced apart from its adjacent terminals or may have a different spacing. FIG. 6 include voltage supply terminals 641 to 646, where the voltage supply terminals 641 to 643 are electrically connected to the bus bar 144, and the voltage supply terminals 644 to 646 are electrically connected to the bus bar 148. Along the bus bar 144, the voltage supply terminal 642 is closer to voltage supply terminal 643, as compared to voltage supply terminal 641. Along the bus bar 148, the voltage supply terminal 645 is closer to voltage supply terminal 644, as compared to voltage supply terminal 646. When the electrochromic device 210 faces east and the sun has just risen in the morning, the electrochromic device 210 may be set to full tinting. In a non-limiting example, the voltage supply terminals 641 to 643 may set to 3 V, and the voltage supply terminals 644 to 646 may be set to 0 V. Later in the morning, the electrochromic device 210 may be continuously graded over substantially the entire length of the electrochromic device 210, and the voltage supply terminal terminals 641 may be set to 3V, the voltage supply terminals 642 and 645 may be allowed to electrically float, the voltage supply terminals 643 and 646 may be set to 1.5 V, and the voltage supply terminal 644 may be set to 0 V. Still later in the day, the portion of the electrochromic device 210 above the voltage supply terminals 642 and 645 may be continuously graded, and the portion of the electrochromic device 210 at and below the voltage supply terminals 642 and 645 may be in a bleached transmission state. In this embodiment, the voltage supply terminal 641 may be set to 3 V, the voltage supply terminals 642, 643, 645, and 646 may be set to 1.5 V, and the voltage supply terminal 644 may be set to 0 V. In this particular embodiment, the grading of light transmission is not used (at sunrise when fully tinted), or the grading of light transmission is maintained continuously graded transmission state. Therefore, no harsh demarcations are seen with the electrochromic device 210 that would occur with discrete grading.

In a further embodiment, the voltage supply terminals 642 and 645 may be closer to the voltage supply terminals 641 and 644, as compared to the voltage supply terminals 643 and 646. Such an embodiment may be useful to allow more transmission of sunlight at sunrise to allow a larger spectrum of wavelengths of light to enter a room or other space. Alternatively, additional voltage supply terminals (not illustrated) may be attached to the bus bars 144 and 148 to achieve substantially the same effect.

In the embodiments as illustrated in FIGS. 5 and 6, the bus bars 144 and 148 can be designed so that the resistances per unit length of the bus bars 144 and 148 have sufficient resistance in order to prevent an electrical short between the voltage supplies terminals connected to the same bus bar. As the distance between voltage supply terminals of the bus bar is relatively shorter, the resistance per unit length may be increased, such as using having a smaller cross-sectional area (for example, a relative narrower or thinner bus bar) or a composition having a higher resistivity, and as the length between voltage supply terminals of the bus bar is relatively longer, the resistance per unit length may be decreases, such as having a larger cross-sectional area (for example, a relatively wider or thicker bus bar) or a composition having a lower resistivity. In a non-limiting example, the apparatus 400 may be designed so that the resistance between the ends of each bus bar 144 and 148 is 1.5 ohms. When the bus bars 144 and 148 are 3 m long, the resistance per unit distance may be 0.5 ohms/cm. When the bus bars 144 and 148 are 1 m long, the resistance per unit distance may be 1.5 ohms/cm. Thus, when comparing the bus bars in the two examples, the latter example may have a composition with a higher resistivity or a smaller cross-sectional area (for example, thinner or narrower), as compared to the former example. Other apparatuses may be designed for resistances other than 1.5 ohms. After reading this specification, skilled artisans will appreciate that the composition and physical design of the bus bars can be adjusted to achieve the desired electrical characteristics for a particular application.

The operation of the electrochromic device 210 will be discussed with respect to the apparatus 400 as illustrated in FIG. 4 as used with the IGU 300 as illustrated in FIG. 3, that includes the electrochromic device 210, bus bars 144 and 148, and voltage supply terminals (VSTs) 541 to 544 as illustrated in FIG. 5. The description is to illustrate the flexibility of different transmission states, and such description is not meant to limit the scope of the present invention, as defined in the appended claims. Table 1 includes exemplary voltages that can be used for different transmission states.

TABLE 1

Exemplary Operating Voltages

| Transmission State | VST 541 | VST 542 | VST 543 | VST 544 |
|---|---|---|---|---|
| Substantially all of EC device fully bleached (highest transmission) | 0 | 0 | 0 | 0 |
| Substantially all of EC device fully tinted (lowest transmission) | 3 | 3 | 0 | 0 |
| Graded - higher transmission (more bleached) near bottom | 3 | 1.5 | 1.5 | 0 |
| Graded - higher transmission (more bleached) near top | 1.5 | 3 | 0 | 1.5 |

Figure 7:
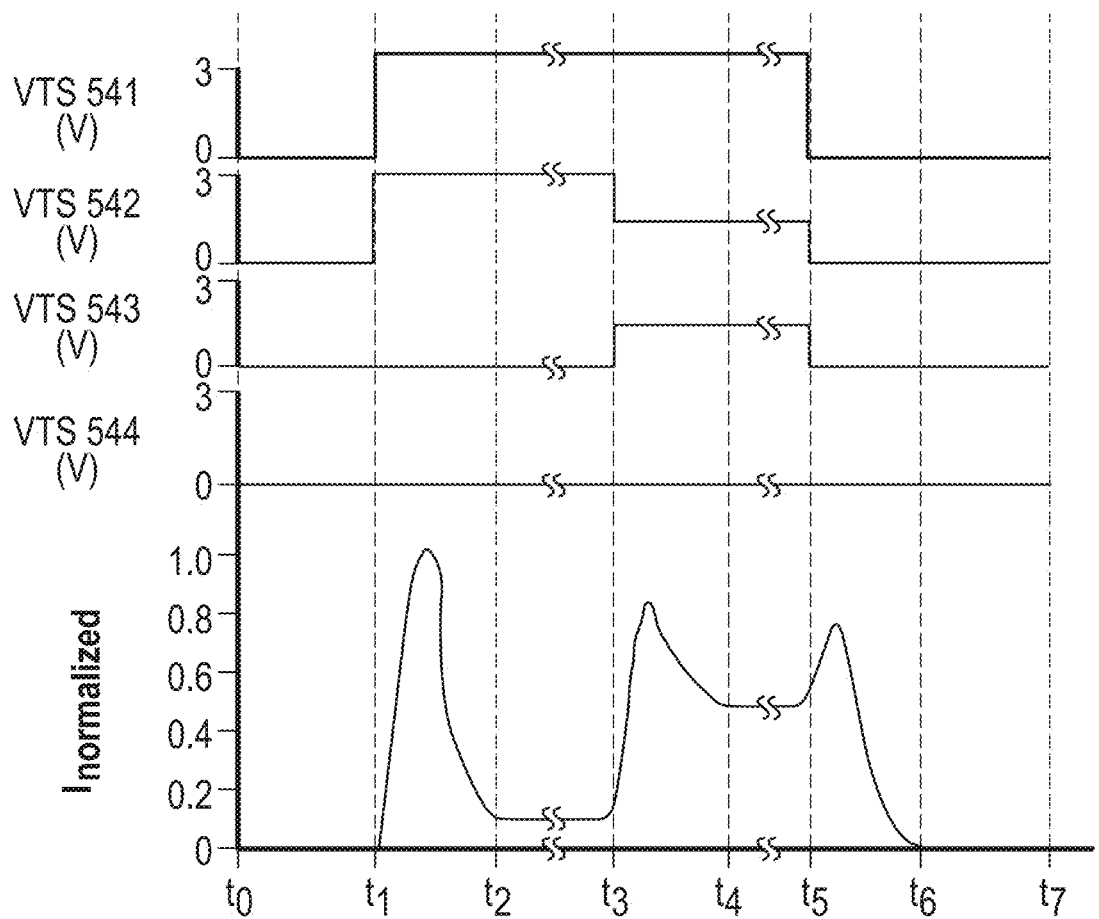
FIG. 7 includes a timing diagram for an exemplary, non-limiting operation of the substructure of FIG. 5.

An exemplary operation is described and illustrated with respect to the timing diagram in FIG. 7. The timing diagram corresponds to the operation of the electrochromic device 210 during a day. Table 1 is used for determining voltages to be supplied to the voltage supply terminals. Thus, the different states described with respect to the timing diagram in FIG. 7 do not match the listing order in Table 1. The current illustrated in FIG. 7 is the absolute value of current normalized to the maximum seen with the electrochromic device 210 during normal operation. Thus, the current in FIG. 7 is unitless.

Figure 8:
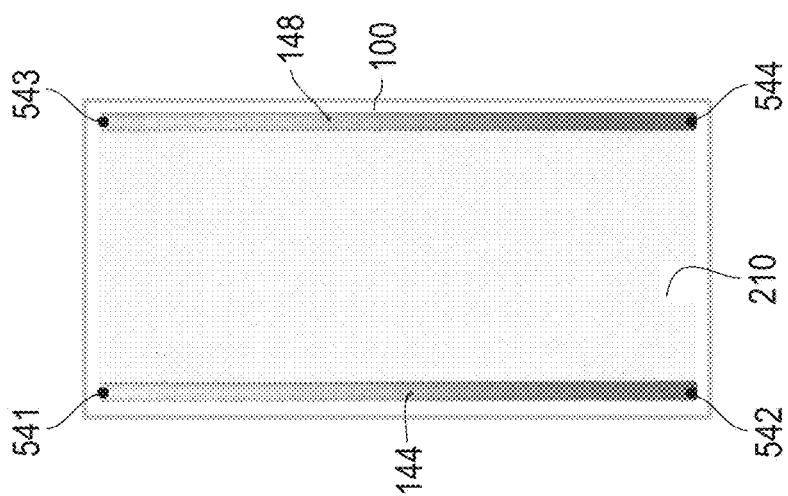
FIG. 8 includes an illustration of a top view of the structure of FIG. 5 when in a fully bleached transmission state.

With respect to FIG. 7, in this particular example, the IGU 300 faces east. At t=0, the electrochromic device 210 can initially start in the fully bleached transmission state. For example, the I/O unit 440 may include a sensor that indicates the light level outside corresponds to nighttime, and such information can be provided to the control device 430. An FPGA of the control device 430 can include a table that correlates state information to an operating mode. For example, from inputs received from the I/O unit 440, and correlate the low outside light level to nighttime. The FPGA may further include information that a fully bleached transmission state (a mode of operation) is to be used for the electrochromic device 210. The control device 430 can transmit signals to the electrochromic device 210, the energy source 420, or both to set the voltages of the voltage supply terminals 541 to 544 to the values corresponding to the fully bleached transmission state in Table 1. Because the voltages at the voltage supply terminals 541 to 544 are 0 V, there is substantially no current flowing through the electrochromic device 210. FIG. 8 includes an illustration of the substrate 100, electrochromic device 210, bus bars 144 and 148, and voltage supply terminals 541 to 544 when in the fully bleached transmission state.

Figure 9:
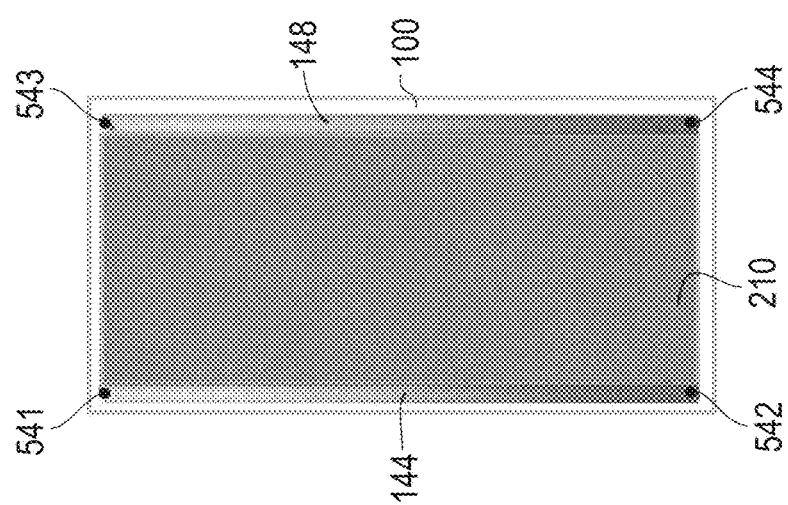
FIG. 9 includes an illustration of a top view of the structure of FIG. 5 when in a fully tinted transmission state.

Shortly after sunrise (t=t1), sunlight may enter the room having the IGU 300. The inputs from the I/O unit 440 may be used to determine the angle of the sun at which the light is the most intense within the room. For example, a set of light sensors may have light-receiving surfaces at different angles with respect to the horizon. The angle may be determined by which light sensor is sensing the most light and associating the angle of the sun above the horizon to the corresponding angle of the light sensor's light receiving surface. Alternatively, a light sensor may include a lens that focuses the light onto a light sensing surface, and the position of the focused light reaching the light sensing surface can be correlated to the angle of the sun with respect to the horizontal plane. The light level information from light sensors can be transmitted from the I/O unit 440 and received by the control device 430. The FPGA of the control device 430 can correlate the light level information from the I/O unit 440 to determine the angle of the sun with respect to the horizon. The FPGA determines that the light level information correlates sun as being a little after sunrise. In another embodiment, the time and day of the year can be used to determine the angle of the sun with respect to the horizon. The FPGA may further include information that a fully tinted transmission state is to be used for the electrochromic device 210 when the sun is visible (not cloudy) and the time is a little after sunrise. The control device 430 can transmit signals to the electrochromic device 210, the energy source 420, or both to set the voltages of the voltage supply terminals 541 to 544 to the values corresponding to the fully tinted transmission state in Table 1. FIG. 9 includes an illustration of the substrate 100, electrochromic device 210, bus bars 144 and 148, and voltage supply terminals 541 to 544 when in the fully tinted transmission state.

In FIG. 7, the time period of t1 to t2 corresponds to the time needed to switch between states, and in this particular example from the fully bleached transmission state at t=0 to the fully tinted transmission state at t=1. The electrochromic device 210 is similar to a capacitor, wherein when changing the voltages on any or all the voltage supply terminals 541 to 544, charge carriers within the electrochromic device 210 are attracted to the oppositely charged terminals. More particularly, ions (positively charged particles) migrate toward a bus bar that is at a relatively lower voltage, and electrons migrate toward a different bus bar that is at a relatively higher voltage.

The time needed to switch states of the electrochromic device 210 can depend on the construction of the electrochromic device (for example, layers and their compositions and thicknesses), geometry of the electrochromic device (for example, area of the electrochromic device, distance between bus bars, etc.), the transmission states of the electrochromic device 210 just before and just after switching, and power supplies and electrical connections. Typically, an electrochromic device takes approximately 10 to 45 minutes, with some particular electrochromic devices having shorter or longer switching times. Thus, the time period of t1 to t2 is almost always less than an hour.

As seen in FIG. 7, the current through the electrochromic device 210 increases to a maximum and then exponentially decays down to the steady state current for the fully tinted transmission state at t2. The maximum current during switching from the fully bleached transmission state to the fully tinted transmission state may be at least 0.8, at least 0.9, or 0.95. In a particular embodiment, the maximum current during switching may be 1.0. The average current during switching may be at least 0.4, at least 0.5, or at least 0.55 and less than the maximum current during switching.

The time period of t2 to t3 corresponds to steady state operation of the electrochromic device 210 in the fully tinted transmission state, as illustrated in FIG. 9. Although in theory, the current through the electrochromic device 210 should be 0.0 at steady state, the electrochromic device 210 has some leakage current at steady state. Depending on the compositions of the layers for the electrochromic device, when in the fully tinted transmission state, the average current through the electrochromic device 210 is in a range of 0 to 0.25. In FIG. 7, the current is illustrated as being at 0.1. In theory, the time period of t2 to t3 may be infinitely long. In practice, the fully tinted transmission state may be used during daytime but not at night. Thus, the t2 to t3 may be at least 1.1 hours, at least 2 hours, at least 6 hours, or at least 12 hours. A time of 6 hours may correspond to an electrochromic device that faces east or west, and a time period of 12 hours may correspond to an electrochromic device that faces south. During summer near the Artic Circle or the Antarctic Circle, the time period may last for days, particularly as the location is closer to the North Pole or the South Pole.

Returning to the exemplary operation, later in the morning (t=t3), sunlight may be further above the horizon, and thus, less light enters the room having the electrochromic device 210. The inputs from the I/O unit 440 may include time of day, the light intensity from light senses, or the like. The inputs may further include a motion sensor that can be used to determine whether the room is occupied by a human. The inputs can be transmitted from the I/O unit 440 to the control device 430. The FPGA of the control device 430 can correlate the information from the I/O unit 440 to the time as being later in the morning and occupancy state. If the room is unoccupied, the electrochromic device 210 may be maintained in the fully tinted transmission state. Maintaining the fully tinted transmission state may help with reducing energy costs. If the room is occupied, the electrochromic device 210 may be changed to a continuously graded transmission state to allow a wider spectrum of wavelengths of light to enter the room. With inputs corresponding to later in the morning and the room being occupied, the FPGA may further include information that a continuously graded transmission state is to be used for the electrochromic device 210. The control device 430 can transmit signals to the electrochromic device 210, and the energy source 420, or both to set the voltages of the voltage supply terminals 541 to 544 to the values corresponding to the continuously graded transmission state in Table 1. In a particular embodiment, the electrochromic device 210 has higher light transmission near the bottom of the electrochromic device 210, and in another particular embodiment, the electrochromic device 210 has higher light transmission near the top of the electrochromic device 210.

In FIG. 7, the time period of t3 to t4 corresponds to the time needed to switch between states, and in this particular example from the fully tinted transmission state to the continuously graded transmission state. As seen in FIG. 7, the current through the electrochromic device 210 increases to a maximum and then exponentially decays down to the steady state continuously graded current at t4.

The maximum current when switching to or from a continuously graded transmission state may be less than the maximum current when switching from a fully bleached transmission state to a fully tinted transmission state, or vice versa. The maximum current when switching to or from a continuously graded transmission state may be greater than the maximum current at steady state for any transmission state. In an embodiment, the maximum current when switching from the fully tinted transmission state to the continuously graded transmission state current is at most 0.8, at most 0.7, or at most 0.6. In an embodiment, the maximum current when switching from the fully tinted transmission state to the continuously graded transmission state current is at least 0.2, at least 0.3, or at least 0.4.

The average current when switching to or from a continuously graded transmission state may be less than the average current when switching from a fully bleached transmission state to a fully tinted transmission state, or vice versa. The average current when switching to or from a continuously graded transmission state may be greater than the average current for any transmission state when at steady state. In an embodiment, the average current during switching may be at least 0.2, at least 0.25, or at least 0.30, and in another embodiment is at most 0.50, at most 0.55, or at most 0.6.

The time needed to switch states of the electrochromic device 210 has been previously discussed with respect to the time period of t1 to t2. Thus, the time period of t3 to t4 may have any of the values as previously described with respect to the time period of t1 to t2. The time period of t3 to t4 may be the same or different than the time period of t1 to t2.

Figure 10:
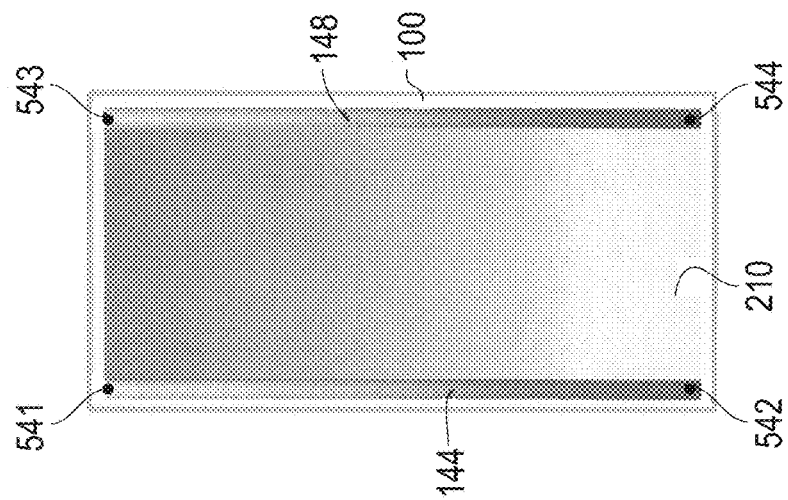
FIG. 10 includes an illustration of a top view of the structure of FIG. 5 when in a continuously graded transmission state, where the highest transmission is near the bottom of the device.
Figure 11:
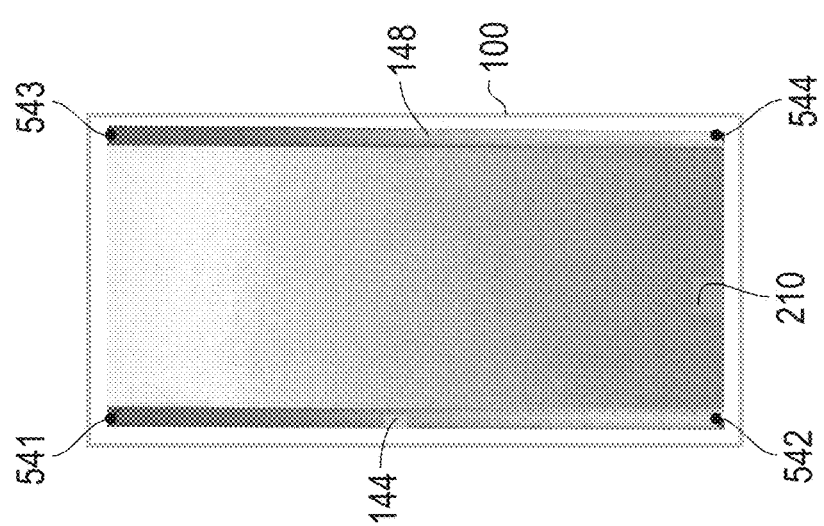
FIG. 11 includes an illustration of a top view of the structure of FIG. 5 when in a continuously graded transmission state, where the highest transmission is near the top of the device.

Referring to FIG. 7, the time period of t4 to t5 corresponds to steady state operation of the electrochromic device 210 in the continuously graded transmission state. FIG. 10 includes an illustration where the electrochromic device is continuously graded with the highest transmission near the bottom of the electrochromic device 210, and FIG. 11 includes an illustration where the electrochromic device is continuously graded with the highest transmission near the top of the electrochromic device 210. The grading in FIG. 11 is the mirror image of the grading in FIG. 10.

The current flowing through the electrochromic device 210 during the continuously graded transmission state can depend on the voltages at the voltage supply terminals 541 to 544. During the continuously graded transmission state, current can be kept relatively low when the average of the voltages at voltage supply terminals 541 and 543 are the same as the average of the voltages at the voltage supply terminals 542 and 544. The average current flowing through the electrochromic device 210 may increase as the difference between the average voltages (for example, the absolute value of the average voltage at voltage supply terminals 541 and 543 minus the average voltage at voltage supply terminals 542 and 544) increases from 0 V. In an embodiment, the average voltage of the voltage supply terminals 541 and 543 (near the top of the electrochromic device 210) is within 20%, within 15%, or within 9% of the average voltage of the voltage supply terminals 542 and 544 (near the bottom of the electrochromic device 210). Referring to Table 1 for the continuously graded transmission state when the highest transmission is at the bottom of the electrochromic device 210, the average voltage for the voltage supply terminals 541 and 543 is (3 V+0 V)/2, or 1.5 V, and the average voltage for the voltage supply terminals 542 and 544 is (1.5 V+1.5 V)/2, or 1.5 V. Thus, the averages are the same. In this particular example, 3 W of power (1.5 W for each bus bar) may be consumed when maintaining the electrochromic device 210 in this state. As a point of comparison, another continuously graded transmission state for the electrochromic device 210 can be achieved when the voltage supply terminal 541 is at 3 V, and the other voltage supply terminals are at 0 V. The average voltage for the voltage supply terminals 541 and 543 is (3 V+0 V)/2, or 1.5 V, and the average voltage for the voltage supply terminals 542 and 544 is (0 V+0 V)/2, or 0 V. For this particular example, 6 W of power may be consumed when maintaining the electrochromic device 210. Thus, the selection of voltages can affect the amount of current consumed when maintaining the continuously graded transmissions state.

At steady state operation, the maximum current flowing through electrochromic device 210 for the continuously graded transmission state is less than the maximum current flowing through the electrochromic device 210 during switching between the continuously graded transmission and either or both of the fully tinted and fully bleached transmission state. Furthermore, the average current flowing through electrochromic device 210 for the continuously graded transmission state is less than the average current flowing through the electrochromic device 210 during switching between the continuously graded transmission and either or both of the fully tinted and fully bleached transmission state.

As compared to the fully bleached and fully tinted transmission states, the average current for the continuously graded transmission state is greater than the average current for either or both of the fully bleached and fully tinted transmission states. In an embodiment, the average current for the continuously graded transmission state is at most 0.4, at most 0.3, or at most 0.25. In an embodiment, the average current for the continuously graded transmission state is at least 0.05, at least 0.1, or at least 0.15.

The considerations for the length of the time period of t4 to t5 described with respect to the time period of t2 to t3 (fully tinted transmission state) also apply to the time period of t4 to t5. The time period of t4 to t5 may the same or different from the time period from t2 to t3.

Returning to the exemplary operation, later in the day (t=t5), sunlight may no longer be directly entering the room through the IGU 300. For example, when the electrochromic device 210 faces east, by 1 pm and later in the day, sunlight may no longer be reaching the IGU 300, and thus, tinting may no longer be needed. The inputs from the I/O unit 440 may include time of day, the light intensity from light senses, or the like. The inputs can be transmitted from the I/O unit 440 to the control device 430. The FPGA of the control device 430 can correlate the information from the I/O unit 440 to the time as being later in the afternoon. With inputs corresponding to afternoon or later in the day, the FPGA may further include information that the fully bleached transmission state is to be used for the electrochromic device 210. The control device 430 can transmit signals to the electrochromic device 210, and the energy source 420, or both to set the voltages of the voltage supply terminals 541 to 544 to the values corresponding to the fully bleached transmission state in Table 1.

In FIG. 7, the time period of t5 to t6 corresponds to the time needed to switch between states, and in this particular example from the continuously graded transmission state to the fully bleached transmission state. As seen in FIG. 7, the current through the electrochromic device 210 increases to a maximum and then exponentially decays down to the steady state fully bleached at t6. The current when switching from the continuously graded transmission state to the fully bleached transmission state may have any of the characteristics or values as previously described with respect to switching from the fully tinted transmission state to the continuously graded transmission state.

The time needed to switch states of the electrochromic device 210 has been previously discussed with respect to the time period of t1 to t2. Thus, the time period of t5 to t6 may have any of the values as previously described with respect to the time period of t1 to t2. The time period of t5 to t6 may be the same or different than either or both of the time periods of t1 to t2 or t3 to t4.

The time period of t6 to t7 corresponds to steady state operation of the electrochromic device 210 in the fully bleached transmission state, as illustrated in FIG. 8. The current through the electrochromic device 210 when in the fully bleached transmission state is described above with respect to the time period of t0 to t1. In theory, the time period of t6 to t7 may be infinitely long. In practice, the fully bleached transmission state may be used during at night or when sunlight is not reaching the IGU 300 (for example, the sky is cloudy or a different side of the building with the IGU 300 is facing the sun). Thus, the t6 to t7 may be at least 1.1 hours, at least 2 hours, at least 6 hours, at least 12 hours, or at least 18 hours. A time of 18 hours may correspond to an electrochromic device that faces east or west, and a time period of 12 hours may correspond to an electrochromic device that faces south. During winter near the Artic Circle or the Antarctic Circle, the time period may last for days, particularly as the location is closer to the North Pole or the South Pole.

In a further embodiment, a relatively negative voltage may be used in the fully bleached state to help the electrochromic device 210 to appear less tinted than if all the voltage supply terminals are a 0 V. For example, the voltage supply terminals 541 and 542 can be at −0.5 V, and the voltage supply terminals can be at 0 V when in the fully bleached state.

The operation as described with respect to the timing diagram in FIG. 7 is exemplary and is not intended to limit the scope of the present invention. If the electrochromic device 210 faces south or west, the operation may be modified. For example, when facing south, the electrochromic device may be in a continuous graded transmission state when sunlight first reaches the electrochromic device, be switched to the fully tinted transmission state around noon, be switched to a continuous graded transmission state around 2 μm, and be switched to the fully bleached transmission state after sunlight is no longer reaching the electrochromic device. When facing west, the electrochromic device may be in a continuous graded transmission state when sunlight first reaches the electrochromic device, be switched to the fully tinted transmission state closer to sunset, be switched to the fully bleached transmission state after sunlight is no longer reaching the electrochromic device.

The operation of the electrochromic device can be overridden by or used in conjunction with the inputs from the I/O unit 440. For example, light sensors may provide information regarding light level that is consistent with storm clouds. Even if the sun is in a position to provide light to the electrochromic device 210, the storm clouds may block a substantial amount of sunlight. Thus, the electrochromic device 210 may be taken to a fully bleached transmission state. Further, a partial transmission state may be used. For example, a significant portion but not all sunlight may pass through thin, high clouds. In an embodiment, only 70% of the maximum tinting may be needed. Thus, for the electrochromic device 210 facing east a little after sunrise, the electrochromic device 210 may be uniform tinted at 70% of the maximum tint level, and later in the morning, the top of the electrochromic device 210 may be at 70% of maximum tint level.

In another example, the IGU 300 with the electrochromic device 210 may face a sloped roof of a neighboring building, and the roof has a blanket of snow. A significant amount of sunlight, which is not directly reaching the electrochromic device 210, may be reflected and reach the electrochromic device. A fully bleached transmission state may not be used due to the intensity of the reflected light. Rather than a 0% tinting level, the tinting level of 20% of the maximum tint level may be used. So a tinting level of 20% may be used uniformly over electrochromic device 210 or use continuous grading where the tint level of 20% is used near the bottom of the electrochromic device 210 and fully bleached near the top. The previously described examples help in illustrate particular applications. After reading this specification, skilled artisans will appreciate that other mode of operations may be used.

Other biasing conditions may be used for the continuous grading if needed or desired. For example, at mid-morning an electrochromic device 210 may be continuously graded but have some tinting near the bottom of the electrochromic device 210. For example, the top of the electrochromic device 210 may be at 100% tinting and the bottom of the electrochromic device may be at 33% tinting. Accordingly, the voltages on the voltage supply terminals 541, 542, 543, and 544 may be 3 V, 2 V, 1 V, and 0 V, respectively.

Figure 12:
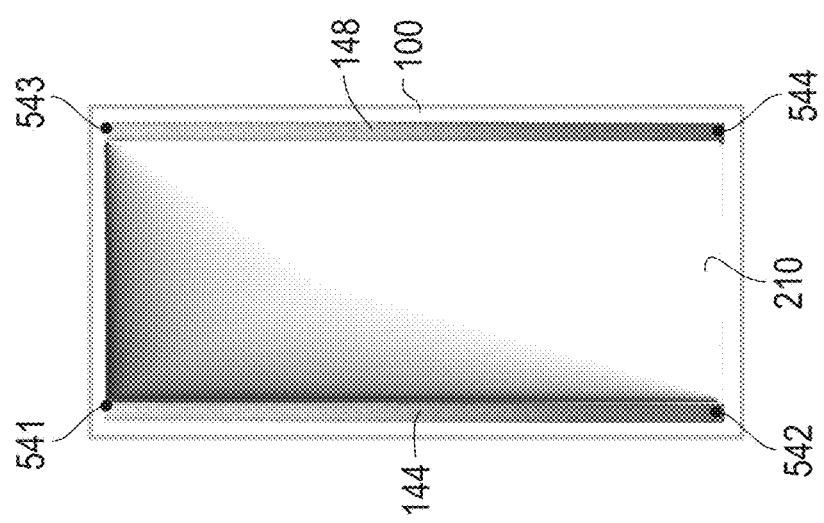
FIG. 12 includes an illustration of a top view of the structure of FIG. 5 when in a continuously graded transmission state in accordance with an alternative embodiment.

Other continuously graded transmission patterns may be used. In an embodiment, the continuously graded transmission state may extend over at lease 27%, at least 50%, at least 75%, at least 90%, or substantially all of an electrochromic device. In another embodiment, continuous grading may be between a pair of terminals along a diagonal. For example, the voltage on the voltage supply terminal 541 may be 3 V, and the voltages on the voltage supply terminals 542 to 544 may be 0 V. FIG. 12 includes an illustration of how such the electrochromic device 210 may appear.

Figure 13:
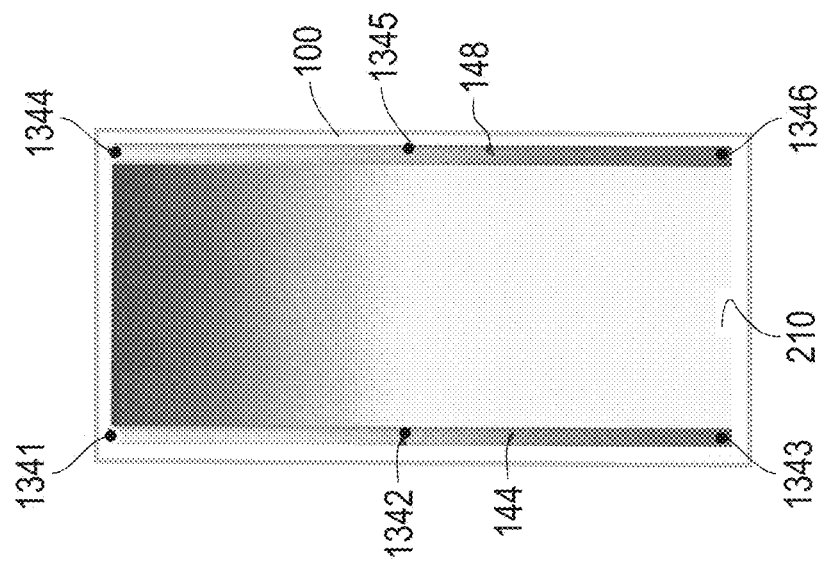
FIG. 13 includes an illustration of a top view of the structure of FIG. 5 when in a portion of the electrochromic device includes a portion in a continuously graded transmission state and another portion in a substantially uniform transmission state.
Figure 14:
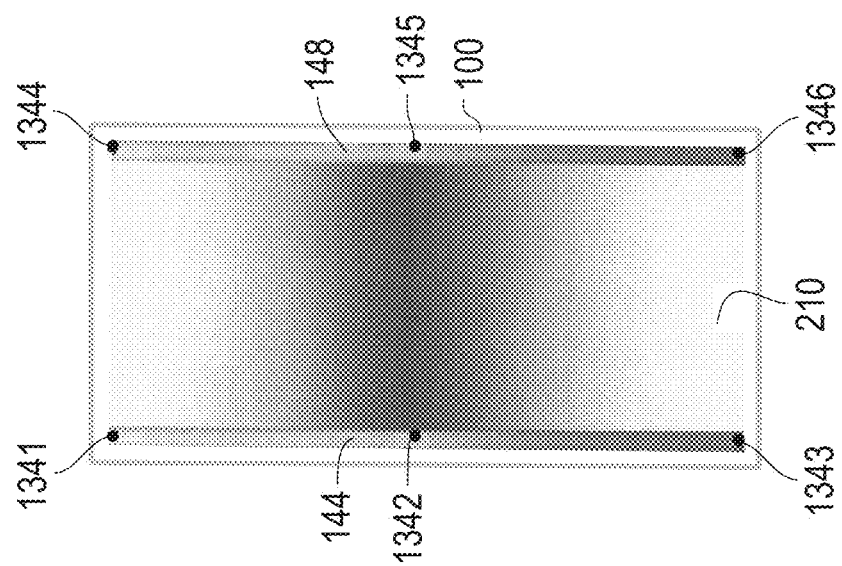
FIG. 14 includes an illustration of a top view of the structure of FIG. 5 when in a continuously graded transmission state in accordance with a further alternative embodiment.

More voltage supply terminals can allow for other patterns and more flexibility in tinting. In each of FIGS. 13 and 14, the voltage supply terminals 1341, 1342, and 1343 are electrically connected to the bus bar 144, and the voltage supply terminals 1344, 1345, and 1346 are electrically connected to the bus bar 148. In FIG. 13, the electrochromic device 210 is continuously graded in the upper half, and fully bleached in the lower half. In FIG. 14, the continuous grading allows for the highest level of tinting near the center and is continuously graded from the center to each of the top and bottom. Below is an exemplary table of voltages that can be used to achieve the patterns in FIGS. 13 and 14.

TABLE 2

Further Exemplary Operating Voltages

| | VST 1341 | VST 1342 | VST 1343 | VST 1344 | VST 1345 | VST 1346 |
|---|---|---|---|---|---|---|
| FIG. 13 | 3 | 1.5 | 1.5 | 0 | 1.5 | 1.5 |
| FIG. 14 | 1.5 | 3 | 1.5 | 1.5 | 0 | 1.5 |

In alternative embodiments, further transmission patterns can be achieve beyond those illustrated in FIGS. 13 and 14. After reading this specification, skilled artisans will appreciate that the number and locations of the voltage supply terminals can allow custom patterns to be attained. As the number of voltage supply terminals increase or the locations of voltage supply terminals changed along each bus bar, more complex transmission patterns may be achieved. Skilled artisans appreciate that an increased number of voltage supply terminal can complicate wiring at installation, and therefore, skilled artisans will be able to determine the number of voltage supply terminals to be used to strike a good balance between number of voltage supply terminals along each bus bar and level of complexity of a transmission pattern.

The shapes of the substrates and electrochromic devices can include other shapes in addition to rectangles. Other shapes can include triangles, other quadrilateral polygons having two adjacent sides with dissimilar lengths, hexagons, octagons, circles, ellipses, and the like. Still further another shape can include a combination of an edge that is linear and another edge that is curved. The substrates and electrochromic devices may be used as architectural glass, vehicle windows, or the like.

Embodiments as illustrated and described above can allow a continuously graded electrochromic device to be maintained for nearly any period of time after switching transmission states is completed. The continuous grading can be more aesthetically pleasing to humans as compared to discrete grading, such as disclosed in US 2014/0177028 (hereinafter, "the '028 Publication"). The configurations and designs in the '028 Publication are based on one power supply terminal per conductive member. FIGS. 4D and 4E in the '028 Publication illustrate continuously graded electrochromic devices; however, such grading cannot be maintained beyond a time period when switching occurs. Thus, FIGS. 4D and 4E are reflective of a transient state, and not steady state. As previously mentioned, changing states involves the movement of charge carriers, and after the charge carriers are moved, the current is substantially reduced, as compared to the maximum current during switching. Thus, after the switching operation is completed, each of bus bars will have a relatively uniform voltage along its length, even the narrower portions of tapered bus bars (FIG. 4D) and where the widths are narrowed in discrete steps (FIG. 4E). Thus, the transient continuous graded transmission state, present during switching, will become a substantially uniform transmission state. For example, one hour after switching, humans may not be able to perceive any grading with respect to the transmission of light for the electrochromic device.

Further designs can be useful to reduce power consumption, provide more flexibility, simplify connections, or combinations thereof. The transparent conductive layers can have a linear resistance (ohms/meter) that is approximately ten times the linear resistance of the bus bars. Gaps between bus bars can allow the transparent conductive layer to act as a resistor between the gaps and allow a continuously graded state to be maintained in the gaps under the bus bars. The gaps can have lengths that are at least 10% of the distance between main bodies or ends of bus bars. The '028 Publication discloses gaps between bus bars to serve a different purpose; however, the lengths of the gaps are less than 5% of the distances between the ends of the bus bars along a side. Such a small gap has an insufficient space for humans to visually detect continuous grading, and thus, humans will observe discrete grading. Furthermore, designs with the gaps do not require custom bus bars, such as those that are thinned or narrowed along the lengths of the bus bars.

Figure 15:
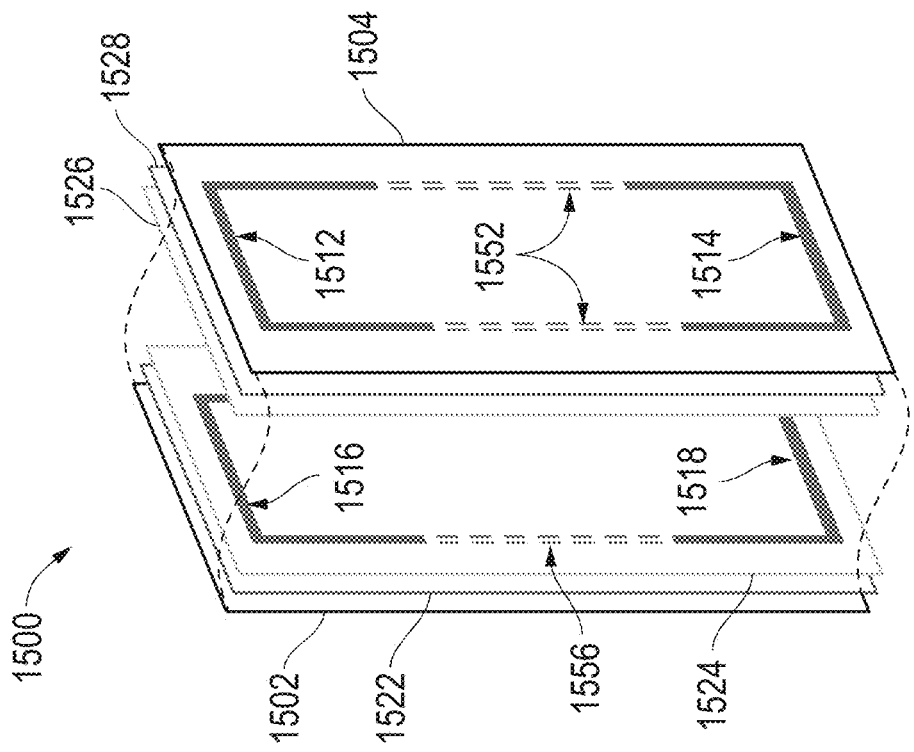
FIG. 15 includes an illustration of a perspective view of a partially disassembled structure in accordance with another embodiment.

FIG. 15 includes a partial disassembled perspective view of a structure 1500 in accordance with another embodiment. Referring to FIG. 15, the structure 1500 includes substrates 1502 and 1504, transparent conductive layers 1522 and 1528, and electrode layers 1524 and 1526. An ion conductive layer can be present but is not illustrated in FIG. 15. The compositions of the transparent conductive layers 1522 and 1528, the electrode layers 1524 and 1526, and the ion conductive layer can have the compositions as previously described and polymer-based compositions. A bus bar 1516 can be formed on the substrate 1502 before forming any of the subsequent layers, and the bus bar 1518 can be formed on the layer 1528 before the substrate 1504 is joined with the substrate 1502. Gaps 1552 and 1556 are present between the bus bars. More details regarding dimensions of the bus bars and gaps in FIG. 15 are described after discussing additional features illustrated in FIG. 16 that can also be present in the embodiment of FIG. 15. During operation, the lower bus bars 1516 and 1518 can be at a fixed potential, such as 0 V, and the upper bus bars 1512 and 1514 can have their voltages selected to achieve a desired light transmission state. In another embodiment, the upper bus bars 1512 and 1514 can be at a fixed potential, such as 0 V, and the lower bus bars 1516 and 1518 can have their voltages selected to achieve a desired light transmission state. In the embodiment illustrated in FIG. 15, the patterns of the bus bars 1512 and 1514 match the patterned of their corresponding lower bus bars 1516 and 1518. In still another embodiment, the bus bars 1516 and 1518 can be replaced by a single bus bar that lies along the periphery of the substrate 1502. Such an embodiment may be useful as it can delay a decision regarding the orientation and transmission pattern until the upper bus bars 1512 and 1514 are formed.

FIG. 16 includes a top view of a structure 1600 that includes bus bars 1612 and 1614. Voltage supply terminals 1642 and 1644 allow electrical connections to be made to the bus bars 1612 and 1614. In FIG. 15, the bus bars 1512, 1514, 1516, and 1518 can have voltage supply terminals similar to the voltage supply terminals 1642 and 1644.

Referring to FIG. 16, extensions 1616 of bus bar 1612 extend partly and not completely to the bus bar 1614, and extensions 1618 of bus bar 1614 extend partly and not completely to the bus bar 1612. Gaps 1652 (illustrated with the dashed lines) are present between the extensions 1616 and 1618 of the bus bars 1612 and 1614. In the embodiment illustrated in FIG. 16, the extensions 1616 extend approximately 10% of the distance from the main body 1613 of the bus bar 1612 to the main body 1615 of the bus bar 1614, and the extensions 1618 extend approximately 10% of the distance from the main body 1615 of the bus bar 1614 to the main body 1613 of the bus bar 1612. Thus, lengths of the gaps 1652 are approximately 80% of the distance between the main bodies 1613 and 1615.

The extensions of the bus bars and gaps therebetween can have different dimensions. Referring to FIG. 15, the extensions of the bus bars 1512, 1514, 1516, and 1518 extend approximately 28% of the distances between the main portions of the corresponding bus bars at the same level, and the lengths of the gaps 1552 and 1556 can be approximately 44% of the distances between main portions of the corresponding bus bars at the same level. In the embodiment illustrated in FIG. 17, a structure 1700 includes bus bars 1712 and 1714. Extensions 1716 extend approximately 40% of the distance from a main body 1713 of the bus bar 1712 to a main body 1715 of the bus bar 1714, and extensions 1718 extend approximately 40% of the distance from the main body 1715 of the bus bar 1714 to the main body 1713 of the bus bar 1712. Thus, lengths of the gaps 1752 are approximately 20% of the distance between the main bodies 1713 and 1715.

More segments of bus bars and gaps can be used if needed or desired. FIGS. 18 to 20 include top views of structures having four bus bars seen from a top view, rather than the two bus bars in FIGS. 15 to 17. FIG. 18 includes bus bars 1812, 1814, and 1832. Voltage supply terminals 1872 are connected to the bus bars 1832. Gaps 1852 are disposed between the bus bars 1832 and extensions 1816 of the bus bar 1812, and gaps 1854 are disposed between the bus bars 1832 and extensions 1818 of the bus bar 1814. The extensions 1816 extend approximately 25% of the distance from the main body 1813 of the bus bar 1812 to the main body 1815 of the bus bar 1814, and the extensions 1818 extend approximately 25% of the distance from the main body 1815 of the bus bar 1814 to the main body 1813 of the bus bar 1812. Each of the lengths of the bus bars 1832 is approximately 20% of the distance from the main body 1813 of the bus bar 1812 to the main body 1815 of the bus bar 1814. Thus, each of lengths of the gaps 1852 and 1854 is approximately 15% of the distance between the main bodies 1813 and 1815 of the bus bars 1812 and 1814.

In another embodiment, bus bars without extensions may be used. The embodiment as illustrated in FIG. 19 is the same as the embodiment in FIG. 18 except that the bus bars do not have extensions. Structure 1900 includes bus bars 1912 and 1914 having main bodies 1913 and 1915 and no extensions. Each of the widths of the main bodies 1913 and 1915 can be approximately 0.5% of the distance between the main bodies. Each of the lengths of the gaps 1952 and 1954 can be approximately 40% of the distance between the main bodies 1913 and 1915. FIG. 20 is similar to FIG. 18 except that no external connections are made to the bus bars 1832. Thus, during operation, the bus bars 1832 can be at a voltage that is between the voltages of the bus bars 1812 and 1814.

Referring to FIGS. 15 to 20, the portions of the electrochromic devices along the gaps can be maintained at a continuously graded transmission state, and other portions, such as between extensions that are part of the same bus bar can be at substantially the same transmission state. Referring to FIG. 16, an upper portion of the electrochromic device between the extensions 1616 can be at a relatively uniform and low transmission state, a lower portion of the electrochromic device between the extensions 1618 can be at a relatively uniform and high transmission state, and a central portion of the electrochromic device between the gaps 1652 can be in a continuously graded transmission state that changes from a transmission state closer to the relatively low transmission state closer to the upper portion to a transmission state closer to the relatively high transmissions state closer to the lower portion.

Referring to FIG. 18, an uppermost portion of the electrochromic device between the extensions 1816 can be at a relatively uniform and low transmission state, a lowermost portion of the electrochromic device between the extensions 1818 can be at a relatively uniform and high transmission state, and a central portion of the electrochromic device between the bus bars 1832 can be at a relatively uniform and intermediate transmission state between the transmission states of the uppermost and lowermost portions. An upper gap portion along the gaps 1852 can be in a continuously graded transmission state that changes from a transmission state closer to the relatively low transmission state near the uppermost portion to a transmission state closer to the intermediate transmission state near the central portion. A lower gap portion along the gaps 1854 can be in a continuously graded transmission state that changes from a transmission state closer to the intermediate transmission state near the central portion to a transmission state closer to the relatively high transmission state near the lowermost portion. More or fewer of the relatively uniform transmission regions and continuously graded regions can be used. The number of relatively uniform transmission region and the number of continuously graded regions can be selected based on a need or desire for a particular application.

When comparing FIGS. 18 and 20, the embodiment in FIG. 18 allows for more flexibility due to the ability to control the bus bars 1832 using the voltage supply terminals 1872. In particular, the center portion between the bus bars 1832 can be at a higher or lower transmission state as compared to both the upper portion (between extensions 1816) and lower portion (between the extensions 1818).

In each of the embodiments described with respect to FIGS. 15 to 18 and 20, the extensions of the bus bars have substantially the same length as compared to one another, and the gaps have substantially the same length as compared to one another. In another embodiment, within a structure, the extensions of the bus bars can have significantly different lengths as compared to one another, and the gaps can have significantly different lengths as compared to one another. For example, referring to FIG. 17, the extension 1716 near the left-hand side may extend 40% of the distance between the main bodies 1713 and 1715, and the extension near the right-hand side may extend 10% of the distance between the main bodies 1713 and 1715. In a further embodiment, no extension may extend from the main body 1713 near the right-hand side.

The orientation of the bus bars can be changed. FIG. 21 allows for the grading to be oriented in a horizontal direction (along the width), rather than in a vertical direction (along the length). In FIG. 21, a structure 2100 includes bus bars 2112 and 2114 that have extensions 2116 and 2118 that extend from the main bodies 2113 and 2115. Voltage supply terminals 2142 and 2144 are connected to the bus bars 2112 and 2114. Gaps 2152 are disposed between the extensions 2116 and 2118. Referring to FIG. 21, a left-hand side portion of the electrochromic device between the extensions 2116 can be at a relatively uniform and low transmission state, a right-hand side portion of the electrochromic device between the extensions 2118 can be at a relatively uniform and high transmission state, and a central portion of the electrochromic device between the gaps 2152 can be in a continuously graded transmission state that changes from a transmission state closer to the relatively low transmission state near the left-hand side portion to a transmission state closer to the relatively high transmissions state near the right-hand side portion. In still another embodiment, the continuous grading is oriented in a direction other than solely along the length or solely along the width. For example, the continuous grading may be oriented diagonally between opposite corners. After reading this specification, skilled artisans will understand that other orientation for the continuous grading may be used, and such orientations may be complex to achieve a custom pattern for a particular application.

Figure 22:
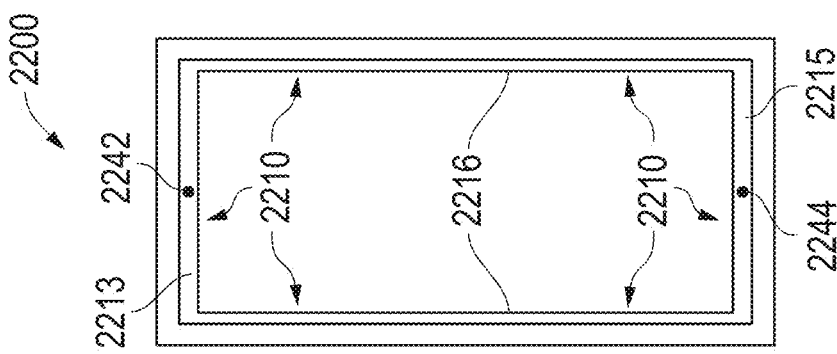
FIG. 22 includes an illustration of includes an illustration of a top view of a structure including bus bars having relatively main portions with a standard width and relatively thinner portions between the main portions.

FIG. 22 provides an embodiment of a structure 2200 to help better understand the performance of such an embodiment as compared to the embodiments in FIGS. 16 to 19. The structure 2200 has a bus bar 2210 that includes main bodies 2213 and 2215 near the top and bottom of the structure. Segments 2216 are along the sides and extend to the main bodies 2213 and 2215, and such segments 2216 have a significantly smaller cross-sectional area as compared to the main bodies 2213 and 2215. Voltage supply terminals 2242 and 2244 are connected to the main bodies 2213 and 2215 of the bus bar 2210.

Simulations were performed on the embodiments as illustrated in FIGS. 16 to 19 and 22. All of the devices had the same area. All of the bus bars had the same width with the exception of the narrower side portions (between the top and bottom of the illustration in FIG. 22) that were 50% of the width of the other bus bars. With respect to biasing conditions, the highest transmission state had a voltage of approximately −0.5 V, the lowest transmission state had a voltage of approximately +3 V, a 6% transmission state has a voltage of approximately +2.0 V, and a 20% transmission state has a voltage of approximately +1.0 V. The voltages are the voltages supplied to bus bar coupled to the ion conductive layer minus the voltages supplied to the bus bar coupled to the electrochromic layer. The transition time between a voltage change and reaching steady state can be in the range of 10 minutes to 60 minutes. Power loss readings were taken after the devices reached steady state. Results are presented below in Table 3. "LT" refers to the lowest transmission state, and "HT" refers to the highest transmission state.

TABLE 3

Simulations Results for Gradient and Lowest Transmission Modes

|  |  | FIG. 16 | FIG. 17 | FIG. 18 | FIG. 19 | FIG. 22 |
|---|---|---|---|---|---|---|
| Gradient Mode | Holding power loss (normalized to FIG. 23) | 14% | 23% | 14% | 12% | 100% |
|  | LT Portion Average Transmission (% T/V) | 3.8%/1.6 V | 2.7%/1.7 V | 3.8%/1.6 V | 4.6%/1.5 V | 3.1%/1.7 V |
|  | HT Portion Average Transmission (% T/V) | 57.5%/0.4 V | 55.8%/0.4 V | 57.2%/0.4 V | 56.7%/0.4 V | 57.8%/0.4 V |
| LT Mode (both potions at LT state) | Holding power loss (normalized to FIG. 23) | 91% | 100% | 69% | 63% | 100% |
|  | LT average transmission (% T/V) | 2.8%/1.9 V | 1.7%/1.9 V | 2.0%/1.8 V | 2.2%/1.8 V | 1.8%/1.9 V |
|  | LT Maximum transmission variation (% T/V) | 1.6%/0.3 V | 0.6%/0.1 V | 0.8%/0.2 V | 0.9%/0.2 V | 0.6%/0.1 V |

As seen with the data in Table 3, the holding power loss in the gradient mode is substantially lower when gaps between the bus bars are used, as compared to FIG. 22. The differences between the HT Portion Accuracy and the LT Portion Accuracy for the embodiments in FIGS. 16 to 19 and 22 are similar. In the LT mode, the embodiments of FIGS. 18 and 19 have significantly lower holding power loss as compared to FIG. 22. The LT Accuracy and LT Uniformity for the embodiment of FIG. 16 are higher than the other embodiments. Overall, the embodiments of FIGS. 18 and 19 provide good power savings when being held at a state and good LT and HT performance characteristics.

An electrochromic device can have a portion that is in a continuously graded transmission state and another portion with a substantially uniform transmission state. The precise point where transition between the continuously graded transmission state and the substantially uniform transmission state may be difficult to see. For example, the portion with the continuously graded transmission state can be fully bleached at one end and fully tinted at the other. The other portion may be fully bleached and be located beside the fully bleached end of the continuously graded portion, or the other portion may be fully tinted and be located beside the fully tint end of the continuously graded portion. Embodiments with discrete grading between portions may be used without deviating from the concepts described herein. For example, an electrochromic device can a portion near the top of a window that is fully bleached, and a remainder that is continuously graded from fully tinted transmission state closer to the top of the window to a fully bleached transmission state near the bottom of the window. Such an embodiment may be useful to allow more light to enter to allow better color balance within the room while reducing glare. In still another embodiment, an electrochromic device can be maintained in a continuously graded state without any portion maintained in a substantially uniform transmission state. Clearly, many different transmission patterns for an electrochromic device are possible.

Many different aspects and embodiments are possible. Some of those aspects and embodiments are described below. After reading this specification, skilled artisans will appreciate that those aspects and embodiments are only illustrative and do not limit the scope of the present invention. Exemplary embodiments may be in accordance with any one or more of the ones as listed below.

Embodiment 1. An apparatus can include an electrochromic device configured to be maintained a continuously graded transmission state of the electrochromic device.

Embodiment 2. The apparatus of Embodiment 1, further including a control device configured to control the electrochromic device in: a first continuously graded transmission state of the electrochromic device over at least 27% of the electrochromic device with a first set of biasing conditions; and a second continuously graded transmission state of the electrochromic device with a second set of biasing conditions, wherein the second continuously graded transmission state is a mirror image of the first continuously graded transmission state.

Embodiment 3. The apparatus of Embodiment 1 or 2, further including: a first transparent conductive layer; a first bus bar having a main body and coupled to the first transparent conductive layer; a second bus bar having a main body and coupled to the first transparent conductive layer; and a first gap between the first and second bus bars, wherein the first gap is at least 10% of a distance between the main bodies of the first and second bus bars.

Embodiment 4. The apparatus of Embodiment 3, further including: a first power supply terminal coupled to the first bus bar; a second power supply terminal coupled to the first bus bar; and a control device configured such that the first and second power supply terminals are at different voltages during a same time period.

Embodiment 5. The apparatus of Embodiment 3 or 4, wherein the first bus bar, the second bus bar, or each of the first and second bus bars includes an extension extending from the main body, wherein the gap is closer to the extension as compared to the main body.

Embodiment 6. The apparatus of any one of Embodiments 3 to 5, further including a third bus bar coupled to the first transparent conductive layer, wherein the first bus bar is spaced apart from the third bus bar by the first gap; and the second bus bar is spaced apart from the third bus bar by a second gap.

Embodiment 7. The apparatus of Embodiment 6, wherein the third bus bar is not connected to a voltage supply terminal or a wire.

Embodiment 8. The apparatus of any one of Embodiments 3 to 5, further including a second transparent conductive layer; a third bar coupled to the second transparent conductive layer; and an electrochromic layer disposed between the first and second transparent conductive layers.

Embodiment 9. The apparatus of Embodiment 8, further including a fourth bus bar coupled to the second transparent conductive layer, wherein the first bus bar overlies the third bus bar, and the second bus bar overlies the fourth bus bar.

Embodiment 10. The apparatus of Embodiment 1 or 2, further including a first bus bar coupled to the electrochromic device; a first power supply terminal coupled to the first bus bar; and a second power supply terminal coupled to the first bus bar, wherein the control device is further configured such that the first and second power supply terminals are at different voltages during a same time period.

Embodiment 11. The apparatus of Embodiment 10, further including a second bus bar coupled to the electrochromic device.

Embodiment 12. The apparatus of Embodiment 11, the first and second bus bars are located along opposite sides of the electrochromic device.

Embodiment 13. The apparatus of Embodiment 11 or 12, further including a third power supply terminal coupled to the second bus bar; and a fourth power supply terminal coupled to the second bus bar, wherein during the same time period, the apparatus is configured such that the third and fourth power supply terminals are at different voltages.

Embodiment 14. The apparatus of Embodiment 11 or 12, wherein the first bus bar has a first length extending in a first direction, the second bus bar has a second length extending in a second direction, and the first and second directions are substantially parallel to each other.

Embodiment 15. The apparatus of Embodiment 14, wherein the first and second lengths are substantially the same.

Embodiment 16. The apparatus of any one of Embodiments 13 to 15, wherein apparatus is configured such that at least two of the first, second, third, and fourth power supply terminals are at substantially the same voltage during the time period.

Embodiment 17. The apparatus of any one of Embodiments 10 to 16, wherein the first bus bar has a substantially uniform cross-sectional area between the first and second power supply terminals.

Embodiment 18. The apparatus of any one of Embodiments 10 to 17, wherein the first bus bar has a substantially uniform composition between the first and second power supply terminals.

Embodiment 19. The apparatus of any one of Embodiments 1 and 3 to 18, wherein the electrochromic device is configured to have a first portion maintained at the continuously graded transmission state and a second portion maintained at a substantially uniform transmission state.

Embodiment 20. The apparatus of any one of Embodiments 1 and 3 to 18, wherein the electrochromic device is configured such that it does not have any portion maintained at a substantially uniform transmission state when any portion of the device is maintained at the continuously graded transmission state.

Embodiment 21. A method of operating an apparatus including an electrochromic device can include: switching the electrochromic device from a first transmission state to a continuously graded transmission state, wherein the electrochromic device has a maximum or average first current during switching the electrochromic device from the first transmission state to the continuously graded transmission state; and maintaining the continuously graded transmission state, wherein the electrochromic device has a maximum or average second current during maintaining the continuously graded transmission state, and the maximum or average second current is less than the maximum or average first current.

Embodiment 22. The method of Embodiment 21, further including switching the electrochromic device from the continuously graded transmission state to a third transmission state, wherein the electrochromic device has a maximum or average third current during switching the electrochromic device from the continuously graded transmission state to the third transmission state, and the maximum or average third current is greater than the maximum or average second current.

Embodiment 23. The method of Embodiment 22, wherein the first and second transmission states are a same transmission state.

Embodiment 24. The method of Embodiment 22, wherein the first and second transmission states are different transmission states.

Embodiment 25. The method of any one of Embodiments 21 to 24, wherein within a main body of the electrochromic device, the first state has a substantially uniform amount of light transmission.

Embodiment 26. The method of any one of Embodiments 21 to 25, wherein the apparatus includes: the electrochromic device having a first edge and a second edge opposite the first edge; a first bus bar coupled to the electrochromic device along the first edge; a first power supply terminal coupled to the first bus bar; a second power supply terminal coupled to the first bus bar, a second bus bar coupled to the electrochromic device along the second edge; a third power supply terminal coupled to the second bus bar; and a fourth power supply terminal coupled to the second bus bar.

Embodiment 27. The method of Embodiment 26, wherein: for first transmission state, the first and second power supply terminals are at substantially a first voltage; and the third and fourth power supply terminals are at substantially a second voltage; and during maintaining the continuously graded transmission state, the first and second power supply terminals are at different voltages; or the third and fourth power supply terminals are at different voltages.

Embodiment 28. The method of Embodiment 26, wherein during maintaining the continuously graded transmission state, the second and third voltages are substantially the same.

Embodiment 29. The method of Embodiment 27, wherein during maintaining the continuously graded transmission state, the first and second voltages are different voltages.

Embodiment 30. The method of Embodiment 29, wherein during maintaining the continuously graded transmission state, the first and fourth voltages are different voltages.

Embodiment 31. The method of Embodiment 27, wherein during maintaining the continuously graded transmission state, the first, second, third, and fourth voltages are different voltages.

Embodiment 32. The method of Embodiment 21, wherein: the first and third power supply terminals are adjacent to a third edge of the electrochromic device; the second and fourth power supply terminals are adjacent to a fourth edge of the electrochromic device; and during maintaining the continuously graded transmission state, the first and third power supply terminals are at a first average voltage, and the second and fourth power supply terminals are at a second average voltage that is within 20%, 15%, 9%, or 5% of the first average voltage.

Embodiment 33. A method of operating an apparatus including an electrochromic device including: providing the apparatus including: a first transparent conductive layer; a first bus bar having a main body and coupled to the first transparent conductive layer; a second bus bar having a main body and coupled to the first transparent conductive layer; and a gap between the first and second bus bars, wherein the gap is at least 10% of a distance between the main bodies of the first and second bus bars; biasing the first bus bar to a first voltage; and biasing the second bus bar to a second voltage different from the first voltage, maintaining the first bus bar at the first voltage and the second bus bar at the second voltage, wherein the gap corresponds to a first portion of the electrochromic device that has a continuously graded transmission state.

Embodiment 34. The method of Embodiment 33, wherein maintaining the first bus bar at the first voltage and the second bus bar at the second voltage is performed such that a second portion of the electrochromic device adjacent to the second bus bar has a first substantially uniform transmission state.

Embodiment 35. The method of Embodiment 34, wherein maintaining the first bus bar at the first voltage and the second bus bar at the second voltage is performed such that a third portion of the electrochromic device adjacent to the first bus bar has a second substantially uniform transmission state, and the first portion of the electrochromic device is disposed between the second and third portions of the electrochromic device.

Note that not all of the activities described above in the general description or the examples are required, that a portion of a specific activity may not be required, and that one or more further activities may be performed in addition to those described. Still further, the order in which activities are listed is not necessarily the order in which they are performed.

Certain features that are, for clarity, described herein in the context of separate embodiments, may also be provided in combination in a single embodiment. Conversely, various features that are, for brevity, described in the context of a single embodiment, may also be provided separately or in any subcombination. Further, reference to values stated in ranges includes each and every value within that range.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range. Many other embodiments may be apparent to skilled artisans only after reading this specification. Other embodiments may be used and derived from the disclosure, such that a structural substitution, logical substitution, or another change may be made without departing from the scope of the disclosure. Accordingly, the disclosure is to be regarded as illustrative rather than restrictive.

What is claimed is:

1. An apparatus comprising an electrochromic device which is configured to be maintained in a continuously graded transmission state, wherein the electrochromic device comprises:
   a first power supply terminal electrically coupled to a first bus bar;
   a second power supply terminal electrically coupled to the first bus bar;
   a control device configured such that the first and second power supply terminals are at different voltages during a same time period;
   a first transparent conductive layer, wherein the first bus bar having a main body and coupled to the first transparent conductive layer;
   a second bus bar having a main body and coupled to the first transparent conductive layer;
   a first gap between the first and second bus bars, wherein the first gap is at least 10% of a distance between the main bodies of the first and second bus bars; and
   a third bus bar coupled to the first transparent conductive layer, wherein the third bus bar is connected to a voltage supply terminal or wire.

2. The apparatus of claim 1, further comprising a second gap between the second bus bar and the third bus bar.

3. The apparatus of claim 1, wherein the first bus bar, the second bus bar, or each of the first and second bus bars includes an extension extending from the main body, wherein the gap is closer to the extension as compared to the main body.

4. The apparatus of claim 1, wherein the first bus bar has a first length extending in a first direction and the second bus bar has a second length extending in a second direction, wherein the first and second directions are substantially parallel to each other.

5. The apparatus of claim 4, wherein the first and second lengths are substantially the same.

6. The apparatus of claim 1, further comprising:
   a second transparent conductive layer;
   a fourth bus bar coupled to the second transparent conductive layer; and
   an electrochromic layer disposed between the first and second transparent conductive layers.

7. The apparatus of claim 6, further comprising a fifth bus bar coupled to the second transparent conductive layer, wherein the first bus bar overlies the fourth bus bar, and the second bus bar overlies the fifth bus bar.

8. The apparatus of claim 1, wherein the electrochromic device is configured to have a first portion maintained at the continuously graded transmission state and a second portion maintained at a substantially uniform transmission state.

9. The apparatus of claim 1, wherein the electrochromic device is configured such that it does not have any portion maintained at a substantially uniform transmission state when any portion of the device is maintained at the continuously graded transmission state.

10. The apparatus of claim 1, further comprising an electrochromic layer disposed between the first and second transparent conductive layers.

11. The apparatus of claim 10, further comprising an ion storage layer and an ion conductive layer disposed between the electrochromic and ion storage layers.

12. An apparatus comprising an electrochromic device which is configured to be maintained in a continuously graded transmission state, wherein the electrochromic device comprises:
   a first power supply terminal electrically coupled to a first bus bar;
   a second power supply terminal electrically coupled to the first bus bar;
   a control device configured such that the first and second power supply terminals are at different voltage during a same time period;
   a first transparent conductive layer, wherein the first bus bar having a main body and coupled to the first transparent conductive layer;
   a second bus bar having a main body and coupled to the first transparent conductive layer;
   a first gap between the first and second bus bar, wherein the first gap is at least 10% of a distance between the main bodies of the first and second bus bars
   a third bus bar coupled to the first transparent conductive layer;
   a third power supply terminal coupled to the second bus bar; and
   a fourth power supply terminal coupled to the second bus bar, wherein during the same time period, the apparatus is configured such that the third and fourth power supply terminals are at different voltages.

13. The apparatus of claim 1, wherein the first bus bar has a substantially uniform cross-sectional area between the first and second power supply terminals.

14. A method of operating an apparatus comprising an electrochromic device comprising:
   switching the electrochromic device from a first transmission state to a continuously graded transmission state, wherein the electrochromic device has a maximum first current and an average first current during switching the electrochromic device from the first transmission state to the continuously graded transmission state; and
   maintaining the continuously graded transmission state, wherein the electrochromic device has a maximum second current and an average second current during maintaining the continuously graded transmission state,
   wherein the maximum second current is less than the maximum first current or the average second current is less than the average first current, and wherein the continuously graded transmission state is maintained within a region defined by a first bus bar and a second bus bar and wherein a control device is configured such that a first power supply terminal and a second power supply terminal are at different voltages during a same time period, and wherein the first power supply terminal and the second power supply terminal are both electrically coupled to the first bus bar, wherein a third power supply terminal and a fourth power supply terminal are both coupled to the second bus bar; and wherein during the same time period the third and fourth power supply terminals are at different voltages.

15. The method of claim 14, further comprising:
   providing the apparatus including:
   a first transparent conductive layer;
   the first bus bar having a main body and coupled to the first transparent conductive layer;
   the second bus bar having a main body and coupled to the first transparent conductive layer; and
   a gap between the first and second bus bars, wherein the gap is at least 10% of a distance between the main bodies of the first and second bus bars.

16. The method of claim 15, wherein switching the electrochromic device comprises biasing the first bus bar to a first voltage; and biasing the second bus bar to a second voltage different from the first voltage.

17. The method of claim 15, wherein maintaining the continuously graded transmission state comprises maintaining the first bus bar at the first voltage and the second bus bar at the second voltage, wherein the gap corresponds to a first portion of the electrochromic device that has a continuously graded transmission state.

18. The method of claim 15, wherein maintaining the first bus bar at the first voltage and the second bus bar at the second voltage is performed such that a second portion of the electrochromic device adjacent to the second bus bar has a first substantially uniform transmission state.

* * * * *